(12) United States Patent
Keromytis et al.

(10) Patent No.: US 10,367,797 B2
(45) Date of Patent: Jul. 30, 2019

(54) METHODS, SYSTEMS, AND MEDIA FOR AUTHENTICATING USERS USING MULTIPLE SERVICES

(71) Applicants: Angelos D. Keromytis, Annandale, VA (US); Elias Athanasopoulos, New York, NY (US); Georgios Kontaxis, New York, NY (US); Georgios Portokalidis, New York, NY (US)

(72) Inventors: Angelos D. Keromytis, Annandale, VA (US); Elias Athanasopoulos, New York, NY (US); Georgios Kontaxis, New York, NY (US); Georgios Portokalidis, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 15/032,940

(22) PCT Filed: Aug. 7, 2014

(86) PCT No.: PCT/US2014/050205
§ 371 (c)(1),
(2) Date: Apr. 28, 2016

(87) PCT Pub. No.: WO2015/047555
PCT Pub. Date: Apr. 2, 2015

(65) Prior Publication Data
US 2016/0255067 A1 Sep. 1, 2016

Related U.S. Application Data

(60) Provisional application No. 61/896,481, filed on Oct. 28, 2013.

(51) Int. Cl.
*H04L 29/06* (2006.01)
*H04L 9/32* (2006.01)

(52) U.S. Cl.
CPC .............. *H04L 63/08* (2013.01); *H04L 9/321* (2013.01); *H04L 9/3247* (2013.01);
(Continued)

(58) Field of Classification Search
CPC ..... H04L 63/08; H04L 9/321; H04L 63/0807; H04L 63/0823; H04L 9/3247; H04L 9/3271
See application file for complete search history.

(56) References Cited

U.S. PATENT DOCUMENTS 6,609,198 B1 * 8/2003 Wood ...................... G06F 21/31
713/155
7,296,290 B2 * 11/2007 Barriga ................... G06F 21/33
726/8

(Continued)

OTHER PUBLICATIONS

Adida, B., "BeamAuth: Two-Factor Web Authentication with a Bookmark", In Proceedings of the 18th ACM Conference on Computer and Communications Security, Chicago, IL, US, Oct. 17-21, 2011, pp. 1-10.

(Continued)

*Primary Examiner* — Oleg Korsak
*Assistant Examiner* — Devin E Almeida
(74) *Attorney, Agent, or Firm* — Byrne Poh LLP

(57) ABSTRACT

Methods, systems, and media for automatically authenticating a user account using multiple services are provided. In accordance with some embodiments of the disclosed subject matter, methods for authenticating a user using multiple services are provided, the methods comprising: receiving, from a client device, first credentials for a target service account; authenticating the target service account based on the first credentials; issuing a redirecting request that directs (Continued)

the client device to at least one vouching service in response to authenticating the target service account; receiving a vouching response indicating that the client device has authenticated a vouching service account with the at least one vouching service, wherein the vouching response includes a vouching token; and providing the client device with access to the target service account in response to determining that the vouching service account is associated with the target service account.

24 Claims, 9 Drawing Sheets

(52) U.S. Cl.
CPC ........ *H04L 9/3271* (2013.01); *H04L 63/0807* (2013.01); *H04L 63/0823* (2013.01)

(56) References Cited

U.S. PATENT DOCUMENTS

| | | | | |
|---|---|---|---|---|
| 2003/0145224 | A1* | 7/2003 | Bailey | H04L 63/083 726/5 |
| 2003/0149781 | A1* | 8/2003 | Yared | G06F 21/41 709/229 |
| 2003/0217288 | A1* | 11/2003 | Guo | G06F 21/33 726/10 |
| 2005/0289341 | A1* | 12/2005 | Ritola | H04L 63/0815 713/168 |
| 2008/0021997 | A1* | 1/2008 | Hinton | H04L 63/0815 709/225 |
| 2008/0221997 | A1 | 9/2008 | Wolfe | |
| 2010/0125906 | A1* | 5/2010 | Golle | G06F 21/31 726/18 |
| 2013/0086670 | A1* | 4/2013 | Vangpat | H04L 9/3213 726/8 |
| 2013/0298215 | A1* | 11/2013 | Kuznetsov | H04L 9/3263 726/8 |
| 2014/0282940 | A1* | 9/2014 | Williams | H04L 63/0815 726/6 |
| 2014/0351910 | A1* | 11/2014 | Tenenboym | H04L 63/0823 726/7 |

OTHER PUBLICATIONS

Bagherzandi et al., "Password-Protected Secret Sharing", In Proceedings of the 18th ACM Conference on Computer and Communications Security, Chicago, IL, US, Oct. 17-21, 2011, pp. 1-11.
Barrett, M., "PayPal Leads Industry Efforts to Move Beyond Passwords", available at https://www.paypal.com/stories/us/paypal-leads-industry-effort-to-move-beyond-passwords, last accessed Oct. 17, 2016, pp. 1-2.
Berners-Lee et al., "Uniform Resource Identifiers (URI): Generic Syntax", Available at: http://www.ietf.org/rfc/rfc2396.txt, Last Updated Aug. 2008, pp. 1-35.
Biddle el al., "Learning From the First Twelve Years", In ACM Computing Surveys, Sep. 2012, pp. 1-25.
Blashki et al., "Game Geek's Goss: Linguistic Creativity in Young Males Within an Online Forum", In Australian Journal of Emerging Technologies and Societies, Nov. 2005, pp. 1-10.
Bojinov et al., "Kamouflage: Loss-Resistant Password Management", In Proceedings of the 15th European Symposium on Research in Computer Security, Athens, GR, Sep. 2010, pp. 1-18.
Bonneau et al., "The Quest to Replace Passwords: A Framework for Comparative Evaluation of Web Authentication Schemes", In Proceedings of the 33rd IEEE Symposium on Security and Privacy, San Francisco, CA, US, Mar. 2012, pp. 1-15.
Bonneau, J., "Statistical Metrics for Individual Password Strength", In Proceedings of the 20th International Conference on Security Protocols, Washington D.C., US, Apr. 12-13, 2012, pp. 1-11.
Bowen et al., "A System for Generating and Injecting Indistinguishable Network Decoys", In Journal of Computer Security, Mar. 2012, pp. 1-20.
Bowen et al., "Tamper Resistant Injection of Believable Decoys in VM-based Hosts for Crimeware Detection", In Proceedings of the 13th International Conference on Recent Advances in Intrusion Detection, Ottawa, ON, CA, Sep. 2010, pp. 1-21.
Burr et al., "Electronic Authentication Guideline", In US Department of Commerce, Technology Administration, National Insitute of Standards and Technology, Aug. 2013, pp. 1-10.
Camenisch et al., "Practical Yet Universally Composable Two-Server Password Authenticated Secret Sharing", In Proceedings of the 2012 ACM Conference on Computer and Communication Security, Raleigh, NC, US, Oct. 2012, pp. 1-27.
Cheswick W., "Rethinking Passwords", In Communications of the ACM, Feb. 2013, pp. 1-113.
Clair et al., "Password Exhaustion: Predicting the End of Password Usefulness", In Proceedings of the 2nd International Conference on Information Systems Security, Kolkota, IN, Dec. 2006, pp. 1-18.
CloudCracker, "Online Hash Cracker", available at: https://web.archive.org/web/20160319080738/https://www.cloudcracker.com/, last accessed Oct. 20, 2016, pp. 1-2.
Crescenzo et al., "Perfectly Secure Password Protocols in the Bounded Retrieval Model", In Theory of Cryptography Conference, New York, NY, US, Mar. 4-7, 2006, pp. 1-20.
Dey et al., "Enhancing Privacy in Federated Login", In Hot Topics in Privacy Enhancing Technologies, Berlin, DE, Jul. 21-23, 2010, pp. 1-13.
Dhamija et al., "Deja Vu: A User Study Using Images for Authentication", In Proceedings of the 9th USENIX Security Symposium, Berkeley, CA, US, Aug. 2000, pp. 1-14.
Dhamija et al., "The Battle Against Phishing: Dynamic Security Skins", In Proceedings of the Symposioum on Usable Privacy and Security, New York, NY, US, Jul. 2005, pp. 77-88.
Dierks, T., "TLS 1.2", available at: https://tools.ietf.org/html/rfc5246, last updated: Aug. 2008, pp. 1-105.
Fielding et al., "HTTP/1.1", available at https://tools.ietf.org/html/rfc2616, last accessed Oct. 17, 2016, pp. 1-177.
Florencio et al., "A Large-Scale Study of the Web Password Habit", In Proceedings of the International Conference on World Wide Web, Banff, AB, CA, May 2007, pp. 1-9.
Gaw et al., "Password Management Strategies for Online Accounts", In Proceedings of the Symposium on Usable Privacy and Security, New York, NY, Jul. 2006, pp. 44-55.
Goodin, D.,"Twitter Detects and Shuts Down Password Data Hack in Progress", available at: http://arstechnica.com/security/2013/02/twitter-detects-and-shuts-down-password-data-hack-in-progress/, last updated: Feb. 1, 2013, pp. 1-4.
Grosse, E., "Gmail Account Security in Iran", available at: https://security.googleblog.com/2011/09/gmail-account-security-in-iran.html, last updated Sep. 8, 2011, pp. 1-3.
Hale, C., "How to Safely Store a Password", available at: https://codahale.com/how-to-safely-store-a-password/, last updated Jan. 31, 2010, pp. 1-4.
Hardt D., "The OAuth 2.0 Authorization Framework", available at: https://tools.ietf.org/html/rfc6749, last updated Oct. 2012, pp. 1-77.
Honan, M., "How Apple and Amazon Security Flaws Let to My Epic Hacking", available at: https://www.wired.com/2012/08/apple-amazon-mat-honan-hacking/, last updated Aug. 6, 2012, pp. 1-13.
Huang et al., "Parallel Browsing Behavior on the Web", In Proceedings of the 21st ACM Conference on Hypertext and Hypermedia, Toronto, ON, CA, Jun. 2010, pp. 13-18.
International Search Report and Written Opinion in International Patent Application No. PCT/US2014/050205, filed Jul. 8, 2014.
Juels et al., "Making Password-Cracking Detectable", In Proceedings of the 2013 ACM SIGSAC Conference on Computer & Communications Security, Berlin, DE, Nov. 2013, pp. 145-160.
Kelley et al., "Guess Again (and Again and Again) Measuring Password Strength by Simulating Password-Cracking Algorithms", In Proccedings of the 33rd IEEE Symposium on Security and Privacy, San Francisco, CA, US, May 2012, pp. 523-537.

(56) References Cited

OTHER PUBLICATIONS

Liebowitz M., "Hacker Posts 6.4 Million LinkedIn Passwords", available at: https://web.archive.org/web/20131215145617/http://www.technewsdaily.com/7839-linked-passwords-hack.html, last updated Jun. 6, 2012, pp. 1-3.

Manning et al., "Foundations of Statistical Natural Language Processing", MIT Press, May 1999, pp. 1-704.

McIntyre, S., "E-mail Discussion at Debian about the wiki.debian.org Security Breach", available at https://web.archive.org/web/20160806022021/https://lwn.net/Articles/531727, last updated Jan. 7, 2013, pp. 1-2.

McMillan, "Google Declares War on the Password", available at: https://www.wired.com/2013/01/google-password/, last updated Jan. 16, 2013, pp. 1-6.

Miculan et al., "Formal Analysis of Facebook Connect Single Sign-On Authentication Protocol," In Proceedings of the 37th International Conference on Current Trends in Theory and Practice of Computer Science, Nový Smokovec, SK, Jan. 2011, pp. 1-19.

Needham S., "The Domino Effect of the Password Leak at Gawker", available at: http://the-domino-effect-password-leak-gawker-10566853.html, last updated Dec. 2, 2011, pp. 1-3.

Percival, C., "Stronger Key Derivation via Sequential Memory-Hard Functions", In the Proceedings of the BSD Conference, Ottawa, ON, CA, May 6-7, 2009, pp. 1-16.

Perez, S., "117 Million Linkedin Emails and Passwords from a 2012 Hack Just Got Posted Online", available at: https://techcrunch.com/2016/05/18/117-million-linkedin-emails-and-passwords-from-a-2012-hack-just-got-posted-online/, last updated: May 18, 2016, pp. 1-6.

Plain Text Offenders, "Directory of Web Sites Storing Passwords in Plain Text", available at http://plaintextoffenders.com/, last accessed Oct. 17, 2016, pp. 1-8.

Provos et al., "A Future-Adaptable Password Scheme", In Proceedings of the USENIX Annual Techinical Conference, Monterey, CA, US, Jun. 6-11, 1999, pp. 1-13.

Recordon et al., "Openid 2.0: A Platform for User-Centric Indentity Management", In Proceedings of the ACM Workshop on Digital Indentity Management, Nov. 2006, pp. 11-15.

Ross et al., "Stronger Password Authentication Using Browser Extensions", In Proceedings of the 14th USENIX Security Symposium, Baltimore, MD, US, Aug. 2005, pp. 1-15.

Schechter et al., "It's No Secret. Measuring the Security and Reliability of Authentication via 'Secret' Questions", In Proceedings of the 30th IEEE Symposium on Security and Privacy, Washington D.C., US, May 2009, pp. 1-16.

Schwartz, M., "Sony Hacked Again, 1 Million Paswords Exposed", available at: http://www.darkreading.com/attacks-and-breaches/sony-hacked-again-1-million-passwords-exposed/d/d-id/1098113?, last updated Jun. 3, 2011, pp. 1-2.

Shamir, A., "How to Share a Secret", In Communications of the ACM, vol. 22 issue 11, Nov. 1979, pp. 612-613.

Shay et al., "Encountering Stronger Password Requirements: User Attitudes and Behavior", In Proceedings of the Symposium on Usable Privacy and Security, Redmond, WA, US, Jul. 2010, pp. 1-20.

Sun et al., "A Billion Keys, But Few Locks: The Crisis of Web Single Sign-on", In Proceedings of the New Security Paradigms Workshop, Concord, MA, US, Sep. 21-23, 2010, pp. 61-72.

The Security Ledger, "New 25 GPU Monster Devours Passwords in Seconds", available at https://securityledger.com/2012/12/new-25-gpu-monster-devours-passwords-in-seconds/, last updated: Dec. 14, 2012, pp. 1-12.

Wang et al., "Signing Me onto Your Accounts through Facebook and Google: a Traffic-Guided Security Study of Commercially Deployed Single-Sign-On Web Services", In Proceedings of the 33rd IEEE Symposium on Security and Privacy, San Francisco, CA, US, May 2012, pp. 1-15.

Weir et al., "Password Cracking Using Probabilistic Context-Free Grammars", In Procceedings of the 30th IEEE Symposium on Security and Privacy, Oakland, CA, US, May 2009, pp. 391-405.

Williams, O., "IEEE Data Breach: 100K Passwords Leak in Plain Text", available at: https://www.neowin.net/news/ieee-data-breach-100k-passwords-leak-in-plain-text, last updated Sep. 26, 2012, pp. 1-4.

Wimberly et al., "Using Fingerprint Authentication to Reduce System Security: An Empirical Study", In Proceedings of the 32nd IEEE Symposium on Security and Privacy, Oakland, CA, US, May 22-25, 2011, pp. 32-46.

Wu et al., "Do Security Toolbars Actually Prevent Phishing Attacks?", In Proceedings of the SIGCHI Conference on Human Factors in Computing Systems, Montreal, QC, CN, Apr. 22-27, 2006, pp. 1-10.

Zhang et al., "The Security of Modern Password Expiration: An Algorithmic Framework and Empirical Analysis", In Proceedings of the 17th ACM Conference on Computer and Communications Security, Chicago, IL, US, Oct. 4-8, 2010, pp. 1-11.

Benevenuto et al., "Characterizing User Behavior in Online Social Networks", In the Proceedings of the 9th ACM SIGCOMM conference on Internet Measurement, Chicago IL, US, Nov. 4-6, 2009, pp. 1-14.

Berners-Lee, T., "Uniform Resource Identifiers (URI): Generic Syntax", The Internet Engineering Task Force—Network Working Group, Aug. 1998, pp. 1-35.

\* cited by examiner

[Authentication Request to example.com (S)]
POST /login HTTP/1.1
Host: www.example.com username=bob&password=password&vouching_service=example.org } 910

[Authentication Response from example.com]
HTTP/1.1 303 See other
Location: https:www.example.org/
login?action=vouch&service=example.com&nonce=...&signature=...&signed_fields=action%2Cservice%2Cnonce } 920

↳ 922

[Authentication Request to example.com (V)]
GET /login HTTP/1.1
Host: www.example.org?
action=vouch&service=example.com&nonce=...&signature=...&signed_fields=action%2Cservice%2Cnonce } 930

FIG. 9

METHODS, SYSTEMS, AND MEDIA FOR AUTHENTICATING USERS USING MULTIPLE SERVICES

CROSS-REFERENCE TO RELATED APPLICATION

This application claims the benefit of U.S. Provisional Patent Application No. 61/896,481, filed Oct. 28, 2013, which is hereby incorporated by reference herein in its entirety.

This invention was made with government support under grant FA8650-11-C-7190 awarded by the Air Force Materiel Command Legal Office. The government has certain rights in the invention.

TECHNICAL FIELD

The disclosed subject matter relates to methods, systems, and media for authenticating a user using multiple services.

BACKGROUND

Password-based authentication is a common form of access control in Web services. For example, a Web service implementing a conventional password-based authentication scheme may require a user to provide a user name and password when the user registers a user account with the Web service. The Web site can then generate a hash value based on the password (e.g., using a one-way hash function) and can store the user name, the hash value, etc. in association with the user account. In response to receiving a user request to access the user account, the Web service may require the user to provide the user name and password to access the user account.

However, conventional password-based authentication schemes may not provide a user with adequate protection. For example, even if users choose long and complex passwords, an attacker can still compromise user accounts protected by passwords using a brute-force approach, a pre-constructed dictionary of potential passwords, etc. As another example, authentication schemes using one-way hash functions can be countered by the evolution of hardware which enables powerful password-cracking platforms. As yet another example, since users frequently reuse passwords for different services, an attacker that compromises a user password in one service (e.g., by breaking into the service and cracking all user passwords stored on the service) can use the user password to impersonate the user into a second service.

Therefore, new mechanisms for authenticating a user are desirable.

SUMMARY

In accordance with some embodiments of the disclosed subject matter, methods, systems, and media for authenticating a user using multiple services are provided.

In accordance with some embodiments of the disclosed subject matter, methods for authenticating a user using multiple services are provided, the methods comprising: receiving, from a client device, first credentials for a target service account; authenticating the target service account based on the first credentials; issuing a redirecting request that directs the client device to at least one vouching service in response to authenticating the target service account; receiving a vouching response indicating that the client device has authenticated a vouching service account with the at least one vouching service, wherein the vouching response includes a vouching token; determining, using a hardware processor, whether the vouching service account is associated with the target service account based on the vouching token; and providing the client device with access to the target service account in response to determining that the vouching service account is associated with the target service account.

In accordance with some embodiments of the disclosed subject matter, systems for authenticating a user using multiple services, the systems comprising: at least one hardware processor that is configured to: receive, from a client device, first credentials for a target service account; authenticate the target service account based on the first credentials; issue a redirecting request that directs the client device to at least one vouching service in response to authenticating the target service account; receive a vouching response indicating that the client device has authenticated a vouching service account with the at least one vouching service, wherein the vouching response includes a vouching token; determine whether the vouching service account is associated with the target service account based on the vouching token; and provide the client device with access to the target service account in response to determining that the vouching service account is associated with the target service account.

In accordance with some embodiments of the disclosed subject matter, non-transitory media containing computer-executable instructions that, when executed by a processor, cause the processor to perform a method for authenticating a user using multiple services are provided. In some embodiments, the method comprising: receiving, from a client device, first credentials for a target service account; authenticating the target service account based on the first credentials; issuing a redirecting request that directs the client device to at least one vouching service in response to authenticating the target service account; receiving a vouching response indicating that the client device has authenticated a vouching service account with the at least one vouching service, wherein the vouching response includes a vouching token; determining whether the vouching service account is associated with the target service account based on the vouching token; and providing the client device with access to the target service account in response to determining that the vouching service account is associated with the target service account.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 9 shows an example of a list of messages that can be used to authenticate a user using multiple services in accordance with some embodiments of the disclosed subject matter.

DETAILED DESCRIPTION

Figure 1:
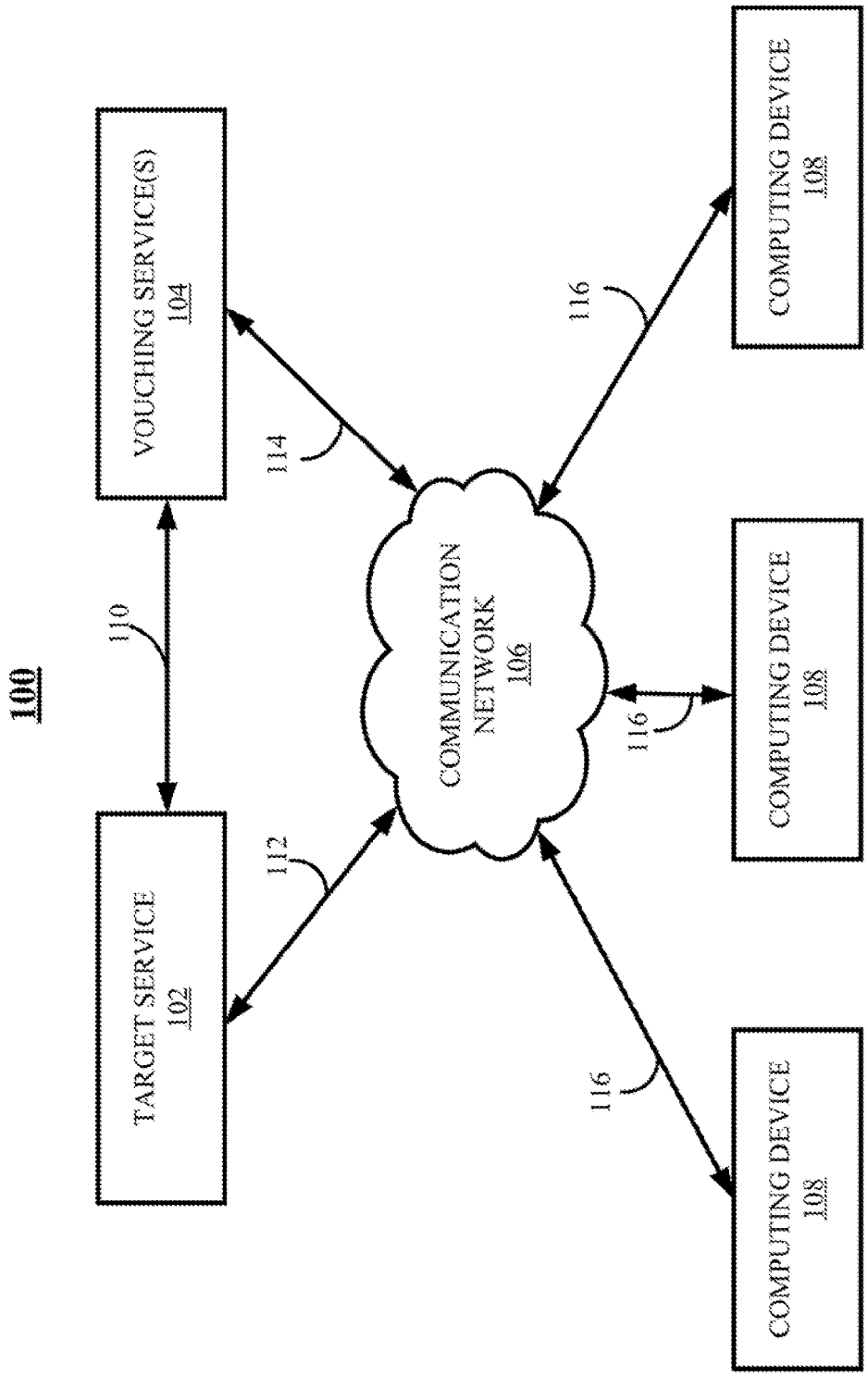
FIG. 1 shows a generalized block diagram of an example of a system for authenticating a user using multiple services in accordance with some embodiments of the disclosed subject matter.

In accordance with various embodiments, as described in more detail below, mechanisms, which can include systems, methods, and computer-readable media, for authenticating a user using multiple services are provided.

In some embodiments, the mechanisms disclosed herein can be implemented using a target service, a client device, and one or more vouching services. In some embodiments, a vouching service can be and/or include any suitable service, such as a dedicated vouching service that provides vouching services, a credit card service, a banking service, an electronic commerce service, an email service, a social networking service, a messaging service, a Web page service, a video streaming service, and/or any other suitable service.

In some embodiments, a user account on a target service (e.g., a target service account) can be associated with one or more vouching services and/or user accounts on the vouching services for authentication. For example, a target service account of a user can be associated with one or more services that are frequently used by the user associated with the target service account, such as a social networking service, a messaging service, a credit card service, a banking service, and/or any other suitable service that is frequently used by the user.

In some embodiments, a target service account can be associated with multiple vouching services and/or user accounts on the vouching services (e.g., vouching service accounts) for authentication. In such embodiments, a user associated with the target service account can be granted access to the target service account upon successfully authenticating the associated vouching service accounts with the vouching services (e.g., by authenticating all of the vouching service accounts associated with the target service account, a threshold number of vouching service accounts associated with the target service account, a predetermined percentage of vouching service accounts associated with the target service account, and/or any other suitable number of vouching service accounts).

In some embodiments, in response to receiving a request to access the target service (e.g., a request for a Web page and/or any other suitable Web content hosted by the target service) from the client device, the target service can request the client device to provide authentication credentials for a user account on the target service (e.g., a target service account). In some embodiments, upon authenticating the target service account, the target service can issue a redirection request to direct the client device to one or more vouching services (e.g., a credit card service, a banking service, an electronic commerce service, an email service, a social networking service, a messaging service, a Web page service, a video streaming service, and/or any other suitable service). In some embodiments, the redirection request can include one or more parameters that can direct the client device to the vouching service(s) (e.g., such as an HTTP 3xx code). In some embodiments, the redirection request can include one or more parameters instructing the vouching service(s) to authenticate the client device.

In some embodiments, upon receiving the redirection request, the client device can transmit one or more vouching requests to the vouching service(s). In some embodiments, the vouching request(s) can include the parameter(s) instructing the vouching service(s) to authenticate the client device.

In some embodiments, in response to receiving a vouching request, a vouching service can require the client device to provide authentication credentials for a user account on the vouching service (e.g., a vouching service account). In some embodiments, in response to receiving the authentication credentials for the vouching service account and/or authenticating the vouching service account, the vouching service can transmit a vouching response to the target service. In some embodiments, the redirection request can include information indicating that the vouching service has authenticated the vouching service account for the client device, a vouching token (e.g., an alias associated with the vouching service account), a persistent token (e.g., an HTTP cookie), and/or any other suitable information. In some embodiments, the vouching response can be transmitted to the target service using one or more suitable redirection requests that can direct a client device to the vouching service and/or to relay the vouching response to the vouching service. In some embodiments, the vouching service can transmit one or more cookies (e.g., HTTP cookies) to the client device upon authenticating the vouching service account. In some embodiments, subsequent authentication requests from the client device can be bypassed in response to detecting the cookie(s). In some embodiments, in response to receiving information about a user action (e.g., information about items that the user wants to purchase from the target service or any other suitable service) from the target service and/or the client device, the vouching service can transmit a message indicating that the user has been authenticated based on the cookie(s) to the target service. Alternatively, the vouching service can initiate a re-authentication process and can authenticate the user and/or the vouching service account associated with the user as described above.

In some embodiments, in response to receiving the vouching response, the target service can determine whether the vouching service account is associated with the target service account. For example, the target service can determine that the vouching service account is associated with the target service account in response to determining that the vouching token (e.g., the alias associated with the vouching service account) matches a token associated with the target service account (e.g., an alias that is stored in association with the target service account).

In some embodiments in which the target service account is associated with multiple vouching service accounts and/or vouching services, each of the associated vouching services can require the client device to provide authentication credentials for a vouching service account in response to receiving a vouching request. In some embodiments, each of the vouching services can transmit a vouching response upon authenticating a vouching service account. In some embodiments, upon receiving multiple vouching responses from the vouching services, the target service can determine whether each of the vouching service accounts is associated with the target service account as described above.

In some embodiments, the target service can provide the client device with access to the target service in response to determining that a predetermined number of vouching service accounts are associated with the target service account (e.g., all of the vouching service accounts that are associated with the target service, a threshold number of vouching service accounts that are associated with the target service, a predetermined percentage of vouching service accounts that are associated with the target service, and/or any other suitable number of vouching service accounts). For example, the target service can transmit the Web content requested by the client device. As another example, the target service can transmit an authentication token to the client device to provide the client device with access to the requested Web content and/or the target service account. In some embodiments, the authentication token can be a persistent authentication token (e.g., an HTTP cookie) that can be used in multiple communication sessions. In some embodiments, the authentication of subsequent HTTP requests from the client device can be bypassed in response to detecting the persistent authentication token. In some embodiments, the mechanisms can generate a set of decoy credentials and can associate the decoy credentials with the target service account. In some implementations, the decoy credentials can be indistinguishable from the actual credentials. In some embodiments, the decoy credentials can be considered legitimate credentials by the target service to protect the actual authentication credentials associated with the target service account. For example, in response to receiving a decoy credential associated with the target service account, the target service can authenticate the target service account based on the received decoy credential. In such an example, the vouching service would not authenticate the vouching service account associated with the target service account in response to receiving the decoy credential.

These mechanisms can perform a variety of functions. For example, the mechanisms can implement a warning system that can issue a warning to a service upon detecting that the service has been compromised. In a more particular example, the vouching service can transmit a message to the target service indicating that the target service account has been compromised in response to detecting multiple unsuccessful authentication attempts in association with the vouching service account.

As another example, the mechanisms can provide access control when a user requests to reset a password with a service. In a more particular example, in response to receiving a user request to reset a password for a user account, the mechanisms can request that the user be authenticated by one or more vouching services. Upon receiving a vouching response from the vouching service(s) indicating that the user has been authenticated by the vouching service(s), the mechanisms can prompt the user to answer one or more security questions (e.g., the name of the user's pet) that were selected by the user when the user account was registered. In some embodiments, in response to receiving correct answers to the security questions, the mechanisms can grant the user access to the user account.

Turning to FIG. 1, a generalized block diagram of an example 100 of a system for authenticating a user account in accordance with some embodiments of the disclosed subject matter is shown. As illustrated, system 100 can include a target service 102, one or more vouching services 104, a communication network 106, one or more client devices 108, communication links 110, 112, and 114, and 116, and/or any other suitable components.

Target service 102 can include any suitable device that can associate a user account with one or more vouching services, authenticate a user account using one or more vouching services, generate, transmit, receive, and/or process redirection requests, and/or perform any other suitable functions, such as a hardware processor, a computer, a data processing device, or a combination of such devices.

Vouching service(s) 104 can include any suitable device that can receive and/or process a vouching request, authenticate a user account based on the vouching request, generate a vouching response responsive to the vouching request, generate, transmit, receive, and/or process redirection requests, and/or perform any other suitable functions, such as a hardware processor, a computer, a data processing device, or a combination of such devices.

In some embodiments, each of target service 102 and vouching service(s) 104 can provide any suitable service, such as a vouching service, an email service, a messaging service, a social networking service, a video streaming service, a Web page service, a credit card service, a banking service, an electronic commerce service, and/or any other suitable service.

Client device(s) 108 can include any suitable device that can receive user inputs, generate, transmit, receive, and/or process redirection requests, and/or perform any other suitable functions, such as a mobile phone, a tablet computer, a wearable computer, a laptop computer, a desktop computer, a personal data assistant (PDA), a portable email device, and/or any other suitable device.

In some embodiments, each of target service 102, vouching service(s) 104, and client device(s) 108 can be implemented as a stand-alone device or integrated with other components of system 100.

In some embodiments, each of target service 102, vouching service(s) 104, and client device(s) 108 can implement any suitable communication protocol, such as the Hypertext Transfer Protocol, the Session Initiation Protocol, and/or any other suitable communication protocol. In some embodiments, each of target service 102, vouching service(s) 104, and client device(s) 108 can implement a communication protocol that can support endpoint redirections. In some embodiments, each of target service 102, vouching service(s) 104, and client device(s) 108 can implement a communication protocol that utilizes a cryptographic protocol, such as Security Sockets Layer (SSL), Transport Layer Security (TLS), and/or any other suitable cryptographic protocol.

In some embodiments, each of target service 102, vouching service(s) 104, and client device(s) 108 can transmit and/or receive a message including one or more parameters that can be used to verify the authenticity of a sender device that generates and/or transmits the message. For example, the message can include a parameter (e.g., such as a parameter "service" as illustrated in message schemas 820, 830, 850, and 860 of FIG. 8) that can be used to identify a domain name, a uniform resource identifier (URI), an alias, and/or any other suitable information relating to a sender device (e.g., a target service, a vouching service, and/or any other suitable service that can send a message).

As another example, the message can include a cryptographic signature generated by the sender device. In some embodiments, the cryptographic signature can be generated using any suitable cryptographic scheme. For example the cryptographic signature can be generated using RSA key pairs and/or the SHA-1 digest algorithm. In some embodiments, the cryptographic signature can be generated based on any suitable parameter or parameters. For example, the cryptographic signature can be generated by signing one or more parameters included in the message using a private key of the sender device. In some embodiments, the message can include a parameter (e.g., a parameter "signed_fields" of message schemas 820, 830, 850, and 860 of FIG. 8) that can identify the parameters based on which cryptographic signature is generated and/or the order in which the parameters have been signed.

As yet another example, the message can include a nonce, such as a timestamp, a counter, a random number, a hash value, and/or any other suitable value. In some embodiments, a nonce can be generated for a particular message and/or a particular device that generates and/or transmits the message. In some embodiments, the nonce can expire upon the termination of a user session. In some embodiments, the nonce can be used to generate a cryptographic signature.

In some embodiments, upon receiving the message, a receiver device (e.g., a target service, a vouching service, a client device, and/or any other suitable device that can receive the message) can identify the sender device based on the message (e.g., by parsing the message and extracting the parameter "service"). The receiver device can then retrieve a public key certification associated with the sender device (e.g., an X.509 certificate) and validate the retrieved certificate. Additionally or alternatively, the receiver device can verify the cryptographic signature generated by the sender device in some embodiments. For example, the receiver device can identify the parameters based on which the cryptographic signature was generated (e.g., by parsing the "signed_fields" parameter) and can then verify the cryptographic signature based on the identified parameters and a public key associated with the sender device. In some embodiments, upon successfully verifying the cryptographic signature, the receiver device can use the parameters associated with the cryptographic signature in the current user session.

In some embodiments, target service 102 and vouching service(s) 104 can exchange Web addresses (e.g., endpoints) associated with target service 102 and vouching service(s) 104 in a suitable manner. For example, the Web addresses can be exchanged offline upon prior agreement. As another example, the Web addresses can be retrieved automatically from an XML file that is hosted under the domain of each service and can be transmitted via a communication protocol utilizing a cryptographic protocol (e.g., the SSL). In such an example, a vouching service can be identified in response to receiving a user input of a domain name of the vouching service.

Communication network 106 can be any suitable computer network such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a satellite network, a mobile phone network, a mobile data network, a cable network, a telephone network, a fiber optic network, and/or any other suitable communication network, or any combination of any of such networks.

In some embodiments, target service 102, vouching service(s) 104, and client device(s) 108 can be connected to communication network 106 through communication links 112, 114, and 116, respectively. In some embodiments, target service 102 can be connected to vouching service(s) 108 through communication link 110. In some embodiments, communication links 110, 112, 114, and 116 can be any suitable communication links, such as network links, dial-up links, wireless links, hard-wired links, any other suitable communication links, or a combination of such links.

Figure 2:
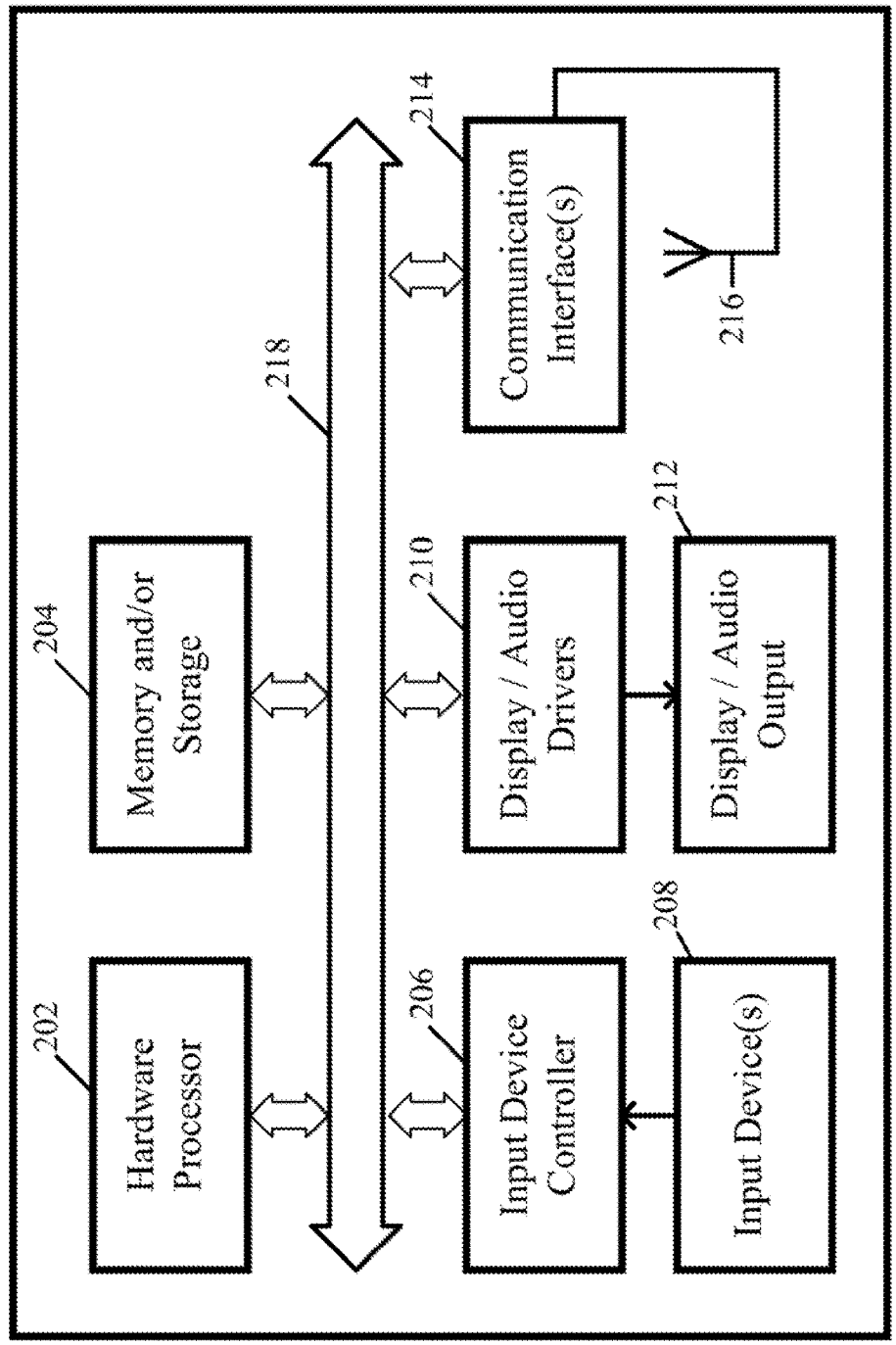
FIG. 2 shows an example of hardware that can be used in a client device, a target service, and/or a vouching service in accordance with some embodiments of the disclosed subject matter.

Each of target service 102, vouching service(s) 104, and client device(s) 108 can include and/or be any of a general purpose device such as a computer or a special purpose device such as a client, a server, and/or any other suitable device. Any such general purpose computer or special purpose computer can include any suitable hardware. For example, as illustrated in example hardware 200 of FIG. 2, such hardware can include a hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor, dedicated logic, and/or any other suitable circuitry for controlling the functioning of a general purpose computer or special purpose computer in some embodiments.

Memory and/or storage 204 can be any suitable memory and/or storage for storing programs, data, media content, and/or any other suitable content in some embodiments. For example, memory and/or storage 204 can include random access memory, read only memory, flash memory, hard disk storage, optical media, and/or any other suitable storage device.

Input device controller 206 can be any suitable circuitry for controlling and receiving input from one or more input devices 208 in some embodiments. For example, input device controller 206 can be circuitry for receiving input from a touch screen, from one or more buttons, from a voice recognition circuit, from a microphone, from a camera, from an optical sensor, from an accelerometer, from a temperature sensor, from a near field sensor, and/or any other suitable circuitry for receiving user input.

Display/audio drivers 210 can be any suitable circuitry for controlling and driving output to one or more display and audio output circuitries 212 in some embodiments. For example, display/audio drivers 210 can be circuitry for driving an LCD display, a speaker, an LED, and/or any other display/audio device.

Communication interface(s) 214 can be any suitable circuitry for interfacing with one or more communication networks, such as communication network 106 in some embodiments. For example, interface(s) 214 can include network interface card circuitry, wireless communication circuitry, and/or any other suitable circuitry for interfacing with one or more communication networks.

Antenna 216 can be any suitable one or more antennas for wirelessly communicating with a communication network in some embodiments. In some embodiments, antenna 216 can be omitted when not needed.

Bus 218 can be any suitable mechanism for communicating between two or more of components 202, 204, 206, 210, and 214 in some embodiments.

Any other suitable components can be included in hardware 200 in accordance with some embodiments.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, and/or any other suitable media), optical media (such as compact discs, digital video discs, Blu-ray discs, and/or any other suitable optical media), semiconductor media (such as flash memory, electrically programmable read only memory (EPROM), electrically erasable programmable read only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Figure 3:
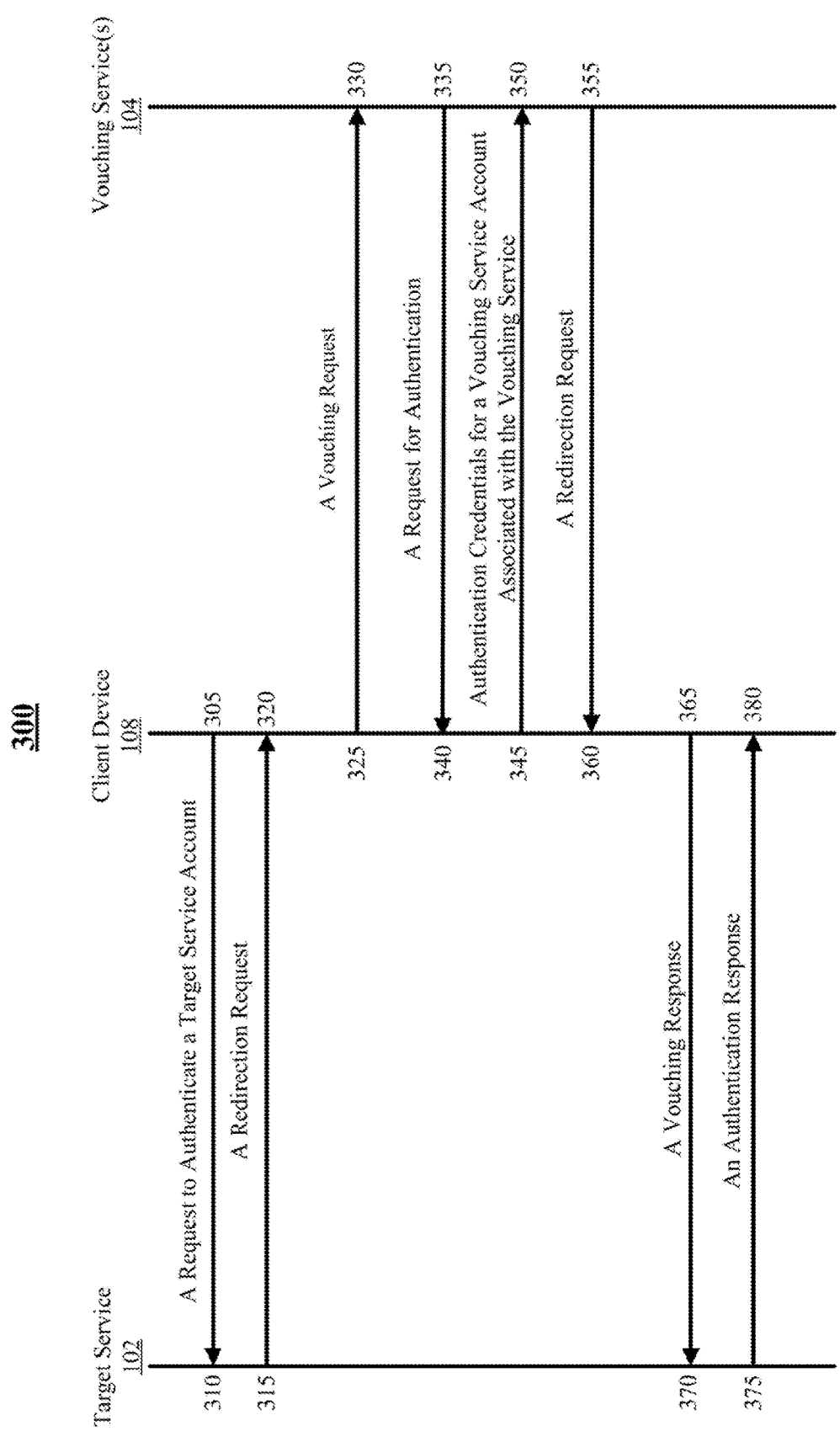
FIG. 3 shows an example of a process for authenticating a user using multiple services in accordance with some embodiments of the disclosed subject matter.

Turning to FIG. 3, an example 300 of a process for authenticating a user using multiple services in accordance with some embodiments of the disclosed subject matter is shown. In some embodiments, process 300 can be implemented using a target service, a client device, and one or more vouching services, each of which can include a hardware processor. For example, as shown in FIG. 3, process 300 can be implemented using a target service 102 of FIG. 1, one or more vouching services 104 of FIG. 1, and/or a client device 108 of FIG. 1. In some implementations, one or more portions of process 300 can be implemented utilizing code embedded in one or more Web pages (e.g., such as Web pages provided by a target service, a vouching service, and/or any other suitable service).

As illustrated, process 300 can begin by a client device transmitting an authentication request to a target service at 305. In some embodiments, the authentication request can include any suitable information. For example, the authentication request can include one or more authentication credentials for a user account on the target service (e.g., a target service account). In a more particular example, the authentication credentials can include a user name, a password, and/or any other suitable authentication credential for the target service account.

As another example, the authentication request can include any suitable information relating to a vouching service that can authenticate the client device. In a more particular example, the request can include a domain name associated with the vouching service, a URI associated with the vouching service, and/or any other suitable information relating to the vouching service.

Figure 8:
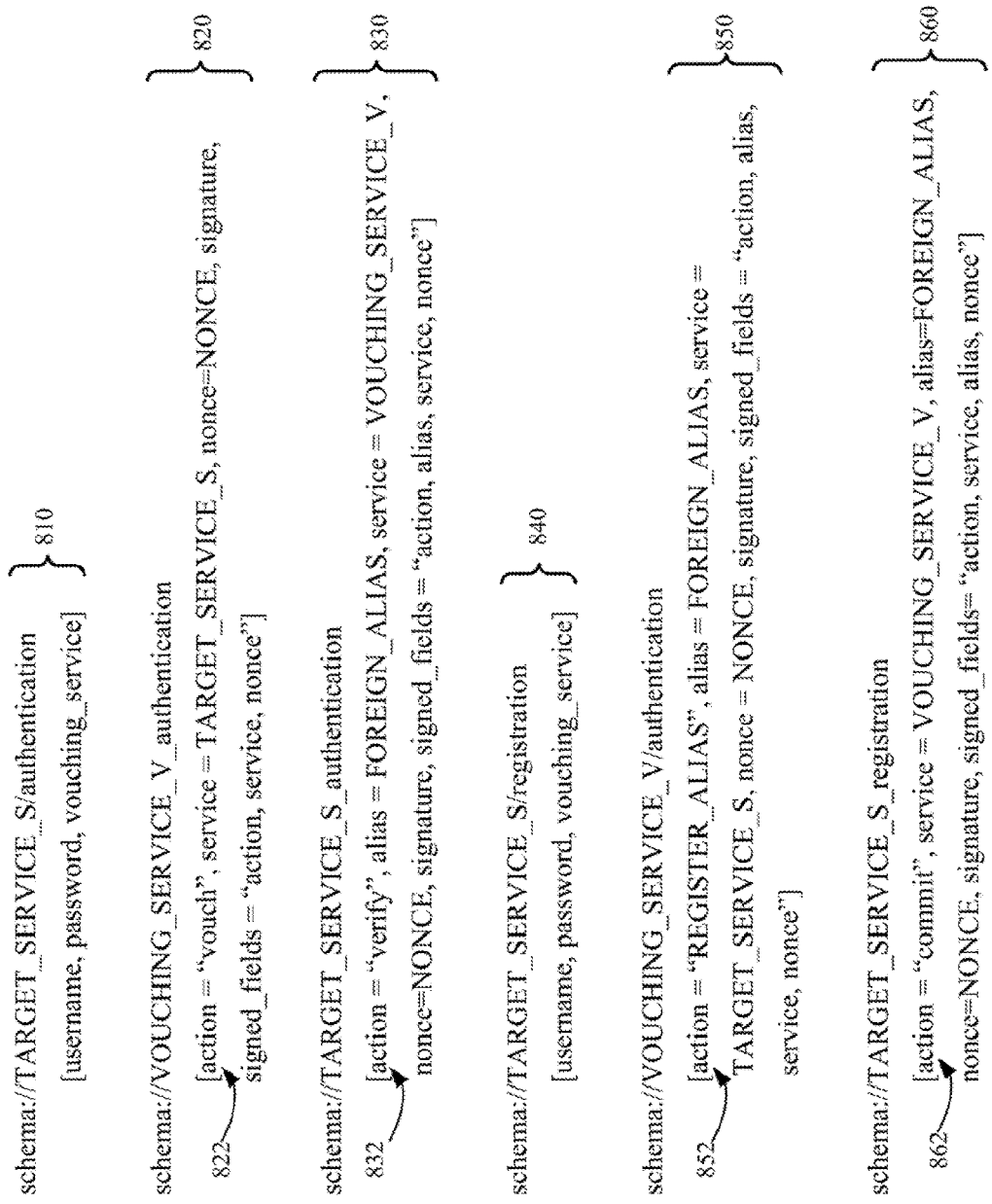
FIG. 8 shows an example of a set of message schemas that can be used to authenticate a user using multiple services in accordance with some embodiments of the disclosed subject matter.

In some embodiments, the authentication request can be generated and/or transmitted in any suitable manner. For example, the authentication request can be transmitted using a message generated based on a message schema 810 as shown in FIG. 8. As another example, the authentication request can be transmitted using a message 910 as illustrated in FIG. 9 in some embodiments.

In some embodiments, upon receiving the authentication request at 310, the target service can validate the authentication credentials for the target service account. For example, the target service can compare the received authentication credentials with authentication credentials that are stored in association with the target service account. The target service can then determine that the received authentication credentials are valid in response to determining that the received authentication credentials match the stored authentication credentials.

In some embodiments, the target service can transmit a redirection request to the client device at 315. In some embodiments, the redirection request can include any suitable information. For example, the redirection request can include one or more instructions that can direct the client device to one or more vouching services (e.g., the vouching service identified in the authentication request received at 310). In a more particular example, the redirection request can include an HTTP 3xx status code, such as an HTTP 303 "see other" status code. In another more particular example, the redirection request can include one or more URIs, domain names, and/or any other suitable information relating to the vouching service(s) and/or a suitable endpoint of the vouching service(s).

As another example, the redirection request can include one or more parameters that can instruct the vouching service(s) to authenticate the client device. In a more particular example, a parameter "action" 822 of FIG. 8 and/or a parameter "action" 922 of FIG. 9 can be set to "vouch" to instruct the vouching service to authenticate the client device in some embodiments.

As yet another example, the redirection request can include a cryptographic signature generated by the target service and/or one or more parameters that can be used to verify the cryptographic signature. In a more particular example, the redirection request can include a parameter that can identify the target service, such as a domain name, a URI, and/or any other suitable parameter that can identify the target service. In another more particular example, the redirection request can include one or more parameters based on which cryptographic signature was generated. In yet another more particular example, the redirection request can include information that identifies the parameters that were used to generate the cryptographic signature and/or the order in which the parameter(s) were signed.

In some embodiments, the redirection request can be transmitted in any suitable manner. For example, the redirection request can be transmitted using a message that is generated based on a message schema 820 as shown in FIG. 8. As another example, the redirection request can be transmitted using a message 920 as illustrated in FIG. 9 in some embodiments.

In some embodiments, in response to receiving the redirection request at 320, the client device can transmit a vouching request to the vouching service(s) at 325. In some embodiments, the vouching request can include any suitable information. For example, the vouching request can include any suitable information contained in the received redirection request, such as the parameter(s) that instruct the vouching service(s) to authenticate the client device, the cryptographic signature generated by the target service, the parameter(s) that can be used to verify the cryptographic signature, and/or any other suitable information. In some embodiments, a message 930 as shown in FIG. 9 can be used to transmit a vouching request.

In some embodiments, in response to receiving the vouching request at 330, the vouching service(s) can verify the authenticity of the vouching request. For example, the vouching service(s) can verify the cryptographic signature generated by the target service. As another example, the vouching service(s) can validate a public-key certificate associated with the target service.

In some embodiments, at 335, the vouching service(s) can transmit a request for authentication credentials to the client device. In some embodiments, in response to receiving the request at 340, the client device can obtain one or more authentication credentials for a user account on the vouching service (e.g., a vouching service account). In some embodiments, these authentication credentials can include a user name, a password, and/or any other suitable authentication credential for the vouching service account. In some embodiments, these authentication credentials can be obtained in any suitable manner. For example, the authentication credentials can be obtained by prompting a user to provide the authentication credentials using an HTML form, a dialog box, and/or any other suitable mechanism. As another example, the client device can retrieve an authentication token, a password, a user name, and/or any other suitable authentication credential that have been stored using a browser cookie and/or any other suitable mechanism.

At 345, the client device can transmit the authentication credentials for the vouching service account to the vouching service. In some embodiments, in response to receiving the authentication credentials at 350, the vouching service can authenticate the vouching service account. The vouching service account can be authenticated in any suitable manner. For example, the vouching service can authenticate the received authentication credentials by comparing the received authentication credentials with authentication credentials that are stored in association with the vouching service account and can determine whether the received authentication credentials match the stored authentication credentials. Additionally or alternatively, the vouching service account can be authenticated using another vouching service that can authenticate the client device.

In some embodiments, in response to authenticating the vouching service account, the vouching service(s) can transmit a redirection request at 355. In some embodiments, the redirection request can include any suitable information. For example, the redirection request can include one or more instructions that can direct the client device to the target device. In a more particular example, the redirection request can include an HTTP 3xx status code, such as an HTTP 303 "see other" status code. In another more particular example, the redirection request can include one or more URIs, domain names, and/or any other suitable information that can identify the target service and/or a suitable endpoint of the target service.

As another example, the redirection request can include one or more parameters indicating that the client device has been authenticated by the vouching service. In a more particular example, a parameter "action" 832 as shown in FIG. 8 can be set to "verify" to indicate that a user account on the vouching service (e.g., the vouching service account) has been authenticated for the client device.

As yet another example, the redirection request can include a vouching token. In a more particular example, the vouching token can include an alias associated with the vouching service account. In some embodiments, the alias can include any suitable combination of letters, number, characters, and/or any other suitable component. In some embodiments, the alias can be associated with the vouching service account using process 400 of FIG. 4, process 500 of FIG. 5, and/or in any other suitable manner.

As still another example, the redirection request can include a cryptographic signature generated by the vouching service and/or one or more parameters that can be used to verify the cryptographic signature. In a more particular example, the redirection request can include a parameter that can identify the vouching service, such as a domain name, a URI, and/or any other suitable parameter that can identify the vouching service. In another more particular example, the redirection request can include one or more parameters based on which cryptographic signature was generated. In yet another example, the redirection request can include information that can identify the parameter(s) that were used to generate the cryptographic signature and/or the order in which the parameter(s) were signed.

In some embodiments, the redirection request can be transmitted in any suitable manner. For example, the redirection request can be transmitted using a message that is generated based on a message schema 830 as shown in FIG. 8.

In some embodiments, upon receiving the redirection request at 360, the client device can transmit a vouching response to the target service at 365. In some embodiments, the vouching response can include any suitable information. For example, the vouching response can include any suitable information contained in the redirection request, such as the parameter(s) indicating that the client device has been authenticated by the vouching service, the vouching token, the cryptographic signature generated by the vouching service, the parameter(s) that can be used to verify the cryptographic signature, and/or any other suitable information.

In some embodiments, in response to receiving the vouching response at 370, the target service can verify the information contained in the vouching response. The information can be verified in any suitable manner. For example, the target service can verify the vouching token contained in the vouching response. In a more particular example, the target service can compare the vouching token (e.g., including the anonymous alias associated with the vouching service account) with a token associated with the target service account (e.g., an anonymous alias associated with the target service account). The target service can then verify the vouching token in response to determining that the vouching token matches the token associated with the target service account.

As another example, the target service can verify the cryptographic signature generated by the vouching service(s). Additionally or alternatively, the target service can retrieve a public-key certificate associated with the vouching service (e.g., an X.509 certificate) based on the information associated with the target service and can then validate the public-key certificate.

In some embodiments, upon verifying the information contained in the vouching response, the target service can transmit an authentication response at 375. In some embodiments, the authentication response can include any suitable information that can provide the client device with access to the target service account. For example, the authentication response can include any suitable Web content (e.g., a Web page) hosted by the target service. As another example, the authentication response can include an authentication token that can be used to access the target service. In some embodiments, the authentication token can be a persistent authentication token that can be used in multiple communication sessions, such as an HTTP cookie. In some embodiments, subsequent authentication of the client device associated with the target service account can be bypassed in response to detecting the persistent authentication token.

While the disclosed subject matter generally relates to authenticating a target service account on a target service using a vouching service account on a vouching service, this is merely illustrative. For example, the target service account can be authenticated using multiple vouching services and/or multiple vouching service accounts on one or more vouching services. In such an example, the client device can be granted access to the target service account upon successfully authenticating a predetermined number of vouching service accounts (e.g., all of the vouching service accounts associated with the target service account, a threshold number of vouching service accounts associated with the target service account, a predetermined percentage of vouching service accounts associated with the target service account, and/or any other suitable number of vouching service accounts).

Figure 4:
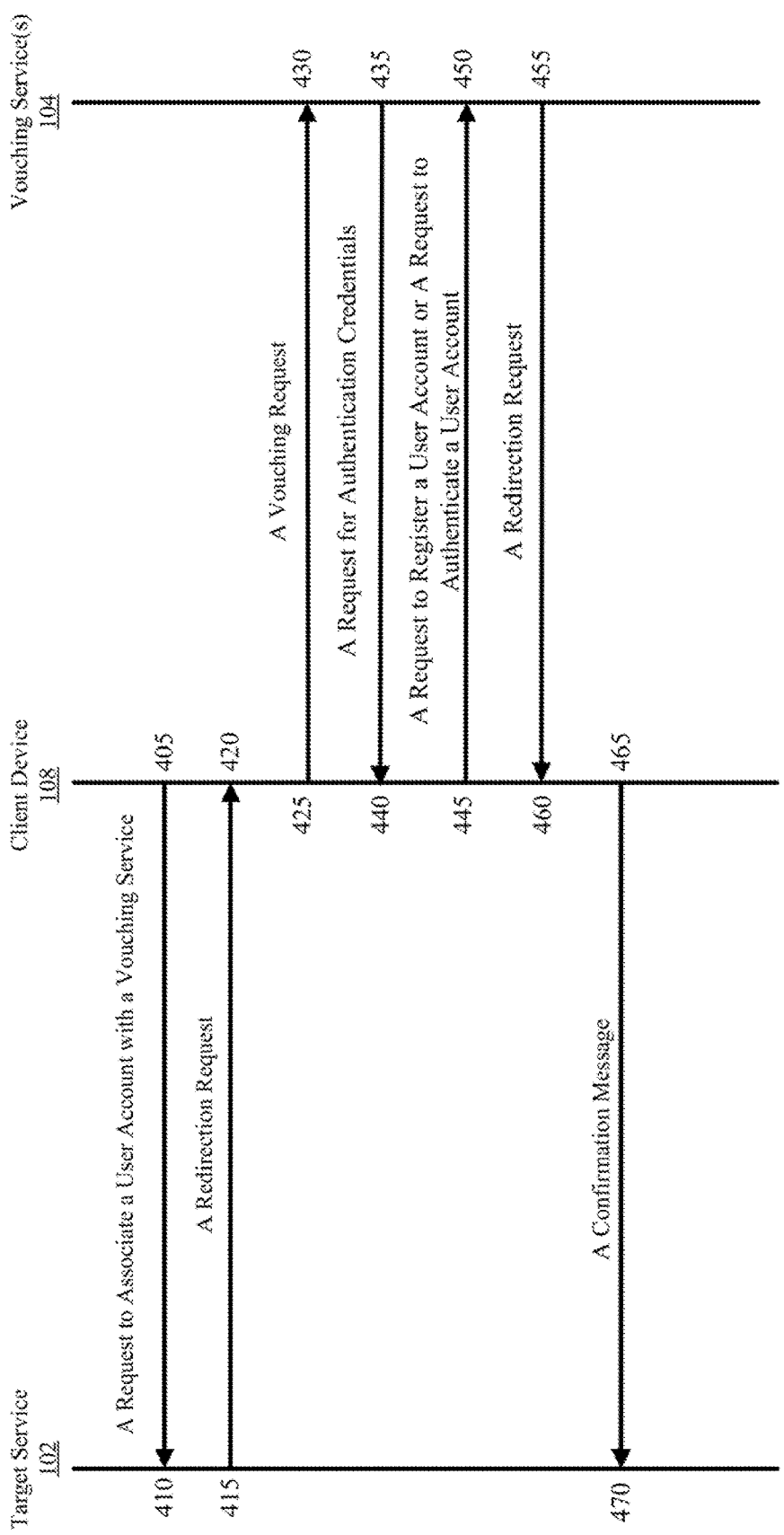
FIG. 4 shows an example of a process for associating a user account on a target service with a user account on a vouching service in accordance with some embodiments of the disclosed subject matter.

Turning to FIG. 4, a flow chart of an example 400 of a process for associating a target service account on a target service with a vouching service account on a vouching service in accordance with some embodiments of the disclosed subject matter is shown. In some embodiments, process 400 can be implemented using a target service, a client device, and a vouching service, each of which can include a hardware processor. For example, as shown in FIG. 4, process 400 can be implemented using a target service 102 of FIG. 1, a vouching service 104 of FIG. 1, and/or a client device 108 of FIG. 1. In some implementations, one or more portions of process 400 can be implemented utilizing code embedded in one or more Web pages (e.g., such as Web pages provided by a target service, a vouching service, and/or any other suitable service).

As illustrated, process 400 can begin by a client device transmitting a request to associate a vouching service with a target service account at 405. In some embodiments, the request can include any suitable information. For example, the request can include one or more authentication credentials for the target service account. In a more particular example, the authentication credentials can include a user name, a password, and/or any other suitable authentication credential. As another example, the request can include any suitable information relating to the vouching service. In a more particular example, the request can include a URI associated with the vouching service, a domain name of the vouching service, and/or any other suitable information relating to the vouching service.

In some embodiments, the request can be transmitted in any suitable manner. For example, the request can be transmitted using a message that is generated based on a message schema 840 of FIG. 8.

In some embodiments, upon receiving the request at 410, a target service can authenticate the target service account. The target service account can be authenticated in any suitable manner. For example, the target service account can be authenticated by comparing the received authentication credentials and a set of authentication credentials stored in association with the user account. As another example, the user account can be authenticated using one or more vouching services that have been previously associated with the user account (e.g., using process 300 of FIG. 3). As yet another example, the target service can authenticate the user account by creating a new user account and associating the received authentication credentials with the new user account.

At 415, the target service can transmit a redirection request to the client device. In some embodiments, the redirection request can include any suitable information. For example, the redirection request can include one or more instructions that can direct the client device to the vouching device. In a more particular example, the redirection request can include an HTTP 3xx status code, such as an HTTP 303 "see other" status code. In another more particular example, the redirection request can include one or more URIs, domain names, and/or any other suitable information that can identify the vouching service and/or a suitable endpoint of the vouching service.

As another example, the redirection request can include an alias that is generated for the target service account. In some embodiments, the alias can include any suitable combination of letters, numbers, characters, and/or any other suitable component.

As yet another example, the redirection request can include one or more parameters that can instruct the vouching service to authenticate the client device. In a more particular example, as illustrated in FIG. 8, a redirection request can be generated based on a message schema 850 and can include a parameter "action" 852 that can instruct the vouching service to authenticate an existing account and/or to register a new account for the client device.

In some embodiments, upon receiving the redirection request at 420, the client device can transmit a vouching request to the vouching service at 425. In some embodiments, the vouching request can include any suitable information. For example, the vouching request can include any suitable information contained in the redirection request, such as the alias, the parameter(s) that can instruct the vouching service to authenticate the client device and/or to register the alias, and/or any other suitable information.

In some embodiments, upon receiving the vouching request at 435, the vouching service can transmit a request for authentication credentials to the client device. In some embodiments, in response to receiving the vouching request at 440, the client device can obtain one or more authentication credentials for a vouching service account on the vouching service. In some embodiments, these authentication credentials can include a user name, a password, and/or any other suitable authentication credential. In some embodiment, these authentication credentials can be obtained in any suitable manner. For example, the authentication credentials can be obtained in response to receiving one or more suitable user inputs of the authentication credentials. As another example, the client device can retrieve the authentication credentials for the vouching service account that have been stored by the client device (e.g., using one or more browser cookies that can store user names, passwords, authentication tokens and/or any other suitable authentication credentials).

At 445, the client device can transmit the authentication credentials for the vouching service account to the vouching service. In some embodiments, at 450, the vouching service can authenticate the vouching service account based on the received authentication credentials. For example, the vouching service can create a new user account and associate the received authentication credentials with the created user account. As another example, the vouching service can authenticate the vouching service account by comparing the received authentication credentials with authentication credentials that are stored in association with the vouching service account and can determine whether the received authentication credentials match the stored authentication credentials. Additionally or alternatively, the vouching service can authenticate the vouching service account using multiple services in some embodiments (e.g., using process 300 of FIG. 3 and/or process 600 of FIG. 6).

In some embodiments, upon authenticating the existing account and/or creating the new user account, the vouching service can associate the target service account with the vouching service account (e.g., by storing the alias in association with the vouching service account).

At 455, the vouching service can transmit a redirection request to the client device. In some embodiments, the redirection request can include any suitable information. For example, the redirection request can include an instruction that can direct the client device to the target service. In a more particular example, the redirection request can include an HTTP 3xx status code, such as an HTTP 303 "see other" status code. In another more particular example, the redirection request can include one or more URIs, domain names, and/or any other suitable information that can identify the vouching service and/or a suitable endpoint of the target service. As another example, the redirection request can include information indicating that the client device has successfully authenticated a user account with the vouching service (e.g., a parameter "action" 862 of FIG. 8). Additionally or alternatively, the redirection request can including information indicating that the target service account has been associated with the vouching service account. As yet another example, the redirection can include a vouching token. In a more particular example, the vouching token can include the alias that was generated for the target service account.

In some embodiments, the redirection request can be transmitted in any suitable manner. For example, the redirection request can be transmitted using a message that is generated based on a message schema 860 as illustrated in FIG. 8.

In some embodiments, upon receiving the redirection request, the client device can transmit a confirmation message to the target service at 465. In some embodiments, the confirmation message can include any suitable information. For example, the confirmation message can include the vouching token, the information indicating that the client device has successfully authenticated a user account with the vouching service, and/or any other suitable information contained in the redirection request received at 460.

In some embodiments, in response to receiving the confirmation message at 470, the target service can associate the vouching service with the target service account. For example, the target service can associate the vouching token with the target service account (e.g., by binding the alias to the target service account). In some embodiments, the target service can store any suitable information relating to the vouching service in association with the target service account. In some embodiments, in response to receiving a subsequent request to authenticate the target service account, the target service can identify the vouching service based on the stored information and can authenticate the target service account by issuing a vouching request to the vouching service (e.g., using process 300 of FIG. 3).

While the disclosed subject matter generally relates to associating a target service account on a target service with a vouching service account on a vouching service, this is merely illustrative. For example, the target service account can be associated with multiple vouching services and/or multiple user accounts on one or more vouching services. In such an example, an alias can be generated for each user account on a vouching service and can be associated with the target service account by the target service.

Figure 5:
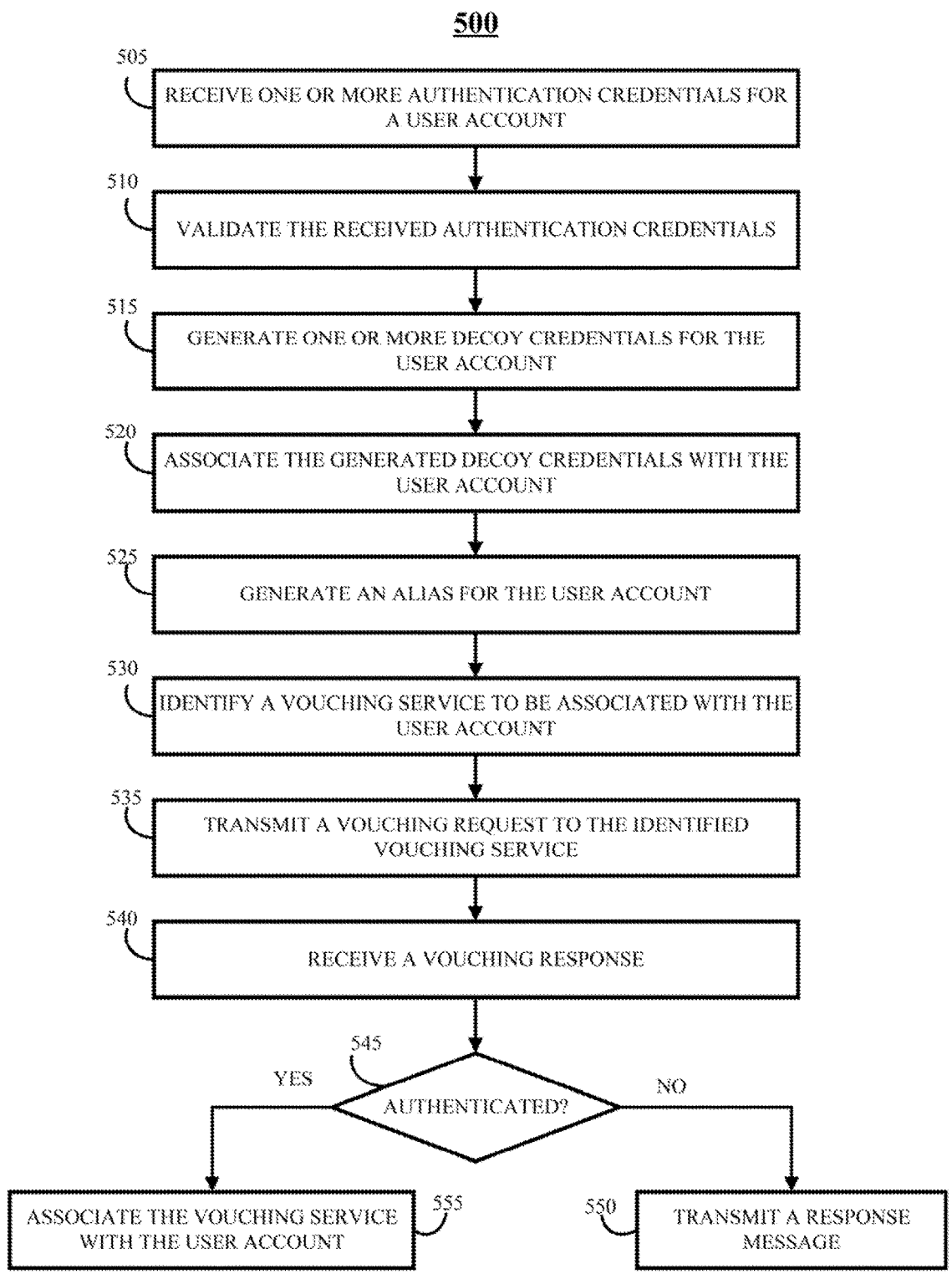
FIG. 5 shows an example of a process for associating a vouching service with a user account in accordance with some embodiments of the disclosed subject matter.

Turning to FIG. 5, a flow chart of an example 500 of a process for associating a vouching service with a user account on a target service in accordance with some embodiments of the disclosed subject matter is shown. In some embodiments, process 500 can be implemented using one or more hardware processors, such as a hardware processor of a target service 102 of FIG. 1.

As illustrated, process 500 can begin by receiving one or more authentication credentials for a user account at 505. In some embodiments, the authentication credentials can include a user name, a password, and/or any other suitable authentication credential.

At 510, process 500 can validate the received authentication credentials. The authentication credentials can be validated in any suitable manner. For example, process 500 can validate the authentication credentials by comparing the authentication credentials with authentication credentials that are stored in association with an existing user account and determining that the received authentication credentials match the stored authentication credentials. As another example, process 500 can validate the authentication credentials using one or more vouching services. In a more particular example, process 300 of FIG. 3 can be used to validate the authentication credentials in some embodiments. As yet another example, process 500 can validate the received authentication credentials by creating a new user account and associating the received authentication credentials with the created user account.

At 515, process 500 can generate one or more decoy credentials for the user account. The decoy credentials can be generated in any suitable manner. For example, the decoy credentials can be generated using any suitable pseudorandom function and/or random function.

As another example, process 500 can identify one or more portions of the received authentication credential(s) (e.g., by grammatically decomposing the received authentication credential(s) using any suitable natural language processing technique). Process 500 can then generate one or more decoy credentials by transforming the identified portions in a suitable manner. In a more particular example, one or more of the identified portions can be transformed into similar portions of a decoy credential by replacing letters of the identified portions with characters and/or symbols (e.g., by replacing "leetspeak" with "!337$p34k"). In another more particular example, one or more of the identified portions can be transformed by producing random permutations that are grammatically similar to the identified components. More particularly, for example, a decoy credential including the phrase of "she plays carefully" and/or the phrase of "she speaks loudly" can be generated for an authentication credential that includes a portion comprising a pronoun, a verb, and an adverb (e.g., an authentication credential including the phrase of "she runs fast").

As yet another example, process 500 can designate one or more suitable portions of an authentication credential associated with the user account as a random string and can identify one or more statistical properties of the designated random string. Process 500 can then generate one or more decoy credentials for the user account by producing one or more random strings having the identified statistical properties. In a more particular example, a decoy credential containing a digit, a lowercase letter, and an uppercase letter (e.g., "0xB," "5cM," and or any other suitable decoy credential) can be generated for an authentication credential including the same statistic properties (e.g., an authentication credential of "6rX").

At 520, process 500 can associate the generated decoy credentials with the user account. In some embodiments, this association can be made in any suitable manner. For example, the decoy credentials can be stored in association with other authentication credentials of the user account. In a more particular example, process 500 can generate a hash for each of the decoy credentials and one or more of the authentication credentials received at 505 (e.g., using any suitable hash function). Process 500 can then generate a password vector by encapsulating the hashes and can store the password vector in association with the user account.

At 525, process 500 can generate an alias for the user account. In some embodiments, the alias can include any suitable combination of letters, number, characters, and/or any other suitable component that can be used to uniquely identify the user account. In some embodiments, the alias can be generated using a suitable random function, pseudorandom function, and/or any other suitable mechanism.

At 530, process 500 can identify a vouching service to be associated with the user account. The vouching service can be identified in any suitable manner. For example, process 500 can cause a list of vouching services to be presented to the user and can then identify a vouching service in response to receiving a user selection of the vouching service. As another example, process 500 can identify a vouching service in response to receiving a user input of a domain name, a URI, and/or any other suitable information that can be used to identify the vouching service.

At 535, process 500 can transmit a vouching request to the identified vouching service. In some embodiments, the vouching request can include any suitable information. For example, the vouching request can include the alias generated for the user account. For example, the vouching request can include information that can instruct the vouching service to authenticate the user. In a more particular example, the vouching request can include one or more parameters that can instruct the vouching service to authenticate an existing account and/or to register a new account for the user (e.g., a parameter "action" 852 of FIG. 8) for the user. Additionally or alternatively, the parameter(s) can instruct the vouching service to associate the alias with the authenticated existing account and/or the new account in some embodiments.

In some embodiments, the vouching request can be transmitted in any suitable manner. For example, the vouching request can be transmitted through a client device using one or more redirection requests. In a more particular example, a message 920 as illustrated in FIG. 9 can be used to direct a client device to the vouching service and/or to relay the vouching request to the vouching service. As another example, the vouching request can be transmitted to the identified vouching service using one or more suitable messages (e.g., one or more HTTP messages).

At 540, process 500 can receive a vouching response from the vouching service. In some embodiments, the vouching response can include any suitable information. For example, the vouching response can include information indicating whether the user has been successfully authenticated by the vouching service. In a more particular example, the vouching response can include a parameter (e.g., a parameter "action" 862 of FIG. 8) indicating that the user has been successfully authenticated by the vouching service. As another example, the vouching response can include a vouching token. In a more particular example, the vouching token can include the alias generated at 525. As yet another example, the vouching response can include information indicating that the user account has been compromised (e.g., an indication that the user has failed to authenticate a user account with the vouching service for a threshold number of times).

At 545, process 500 can determine whether the user has been successfully authenticated by the vouching service based on the received vouching response. In some embodiments, at 550, process 500 can transmit a response message indicating that the vouching service will not be associated with the user account in response to determining that the user has failed to authenticate a user account with the vouching service.

Alternatively, at 555, process 500 can associate the vouching service with the user account in response to determining that the user has been authenticated by the vouching service. In some embodiments, this association can be made in any suitable manner. For example, process 500 can associate the vouching token with the user account. In a more particular example, process 500 can store the alias included in the vouching token in association with the user account and can bind the alias to the user account. In some embodiments, process 500 can store a domain name of the vouching service, a URI associated with the vouching service, and/or any suitable information relating to the vouching service in association with the user account.

While the disclosed subject matter generally relates to associating a vouching service with a user account on a target service, this is merely illustrative. For example, multiple vouching services and/or vouching service accounts can be associated with a target service account and/or a user. In such an example, each of the vouching services and/or vouching service accounts can be associated with the target service account and/or user using one or more suitable portions of process 500 of FIG. 5 in some embodiments.

Figure 6:
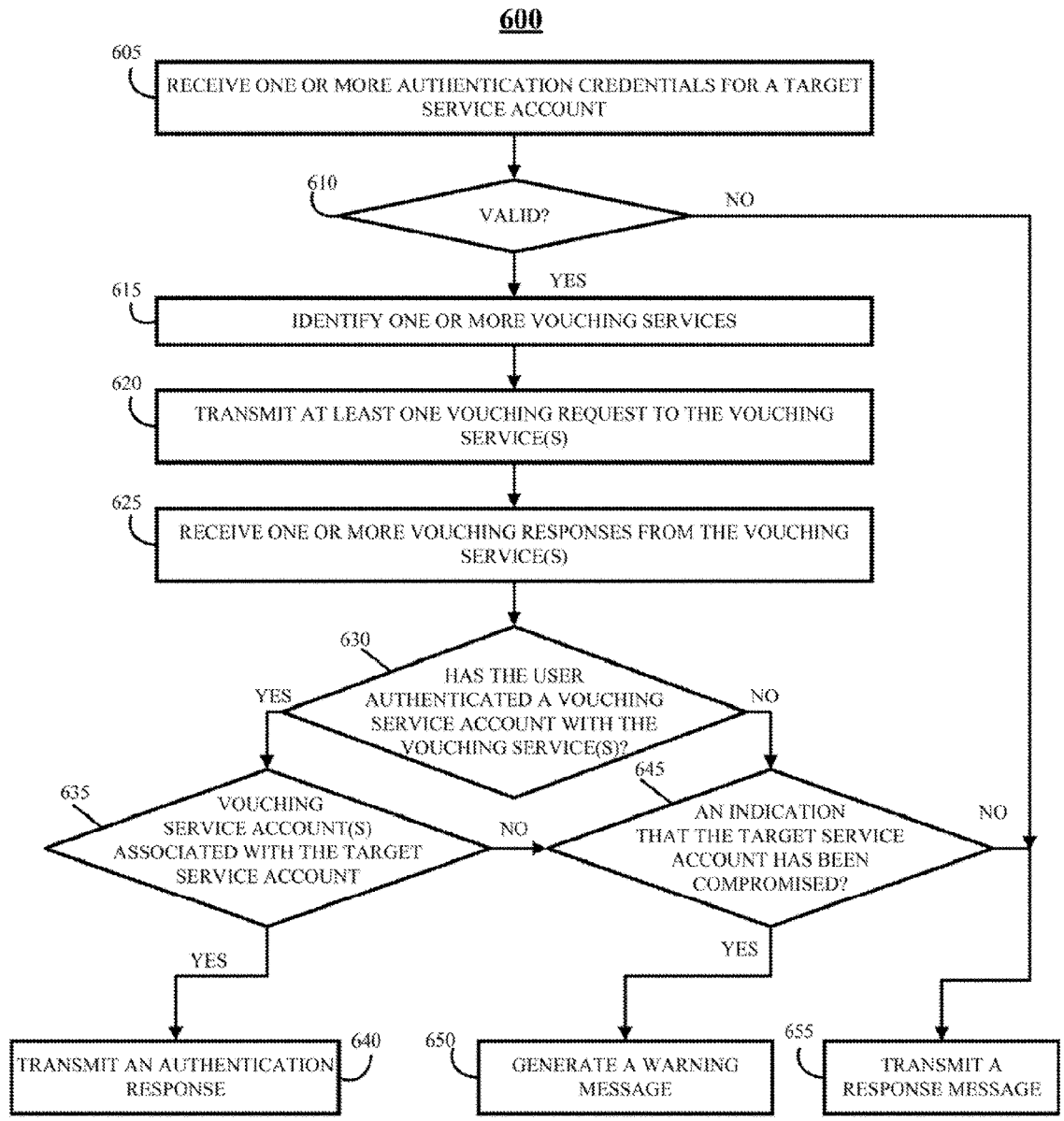
FIG. 6 shows an example of a process for authenticating a user using a vouching service in accordance with some embodiments of the disclosed subject matter.

Turning to FIG. 6, a flow chart of an example 600 of a process for authenticating a user account using one or more vouching services in accordance with some embodiments of the disclosed subject matter is shown. In some embodiments, one or more portions of process 600 can be implemented using one or more hardware processors, such as a hardware processor of a target service 102 of FIG. 1.

As illustrated, process 600 can begin by receiving one or more authentication credentials for a target service account at 605. In some embodiments, the authentication credentials can include a password, a user name, and/or any other suitable credential associated with the target service account.

At 610, process 600 can determine whether the received authentication credentials are valid. This determination can be made in any suitable manner. For example, process 600 can compare the received authentication credentials with authentication credentials stored in associated with the target service account. Process 600 can then determine that the received credentials are valid in response to determining that the received authentication credentials match the stored authentication credentials. In some embodiments, the stored authentication credentials can include one or more authentication credentials provided by a user upon establishing the target service account, one or more decoy credentials associated with the target service account (e.g., such as one or more decoy credentials described in connection with steps 505-510 of FIG. 5), and/or any other suitable authentication credential that can be considered a valid authentication credential.

In some embodiments, in response to determining that one or more of the received credentials are invalid, process 600 can transmit a response message indicating that authorization has been refused for the received authentication credentials at 655.

Alternatively process 600 can identify one or more vouching services at 615. The vouching service(s) can be identified in any suitable manner. For example, the vouching service(s) can be identified in response to receiving a user input of one or more domain names, URIs, and/or any other suitable information that can identify the vouching service(s). As another example, process 600 can present a list of vouching services and can identify the vouching service(s) in response to receiving a user selection of one or more vouching services from the list. In some embodiments, the list of vouching services can include one or more vouching services that have been associated with the user account (e.g., using process 400 of FIG. 4 and/or process 500 of FIG. 5). Alternatively or additionally, the list of vouching services can include any suitable service that can authenticate the user, such as a social networking service, an email service, a messaging service, a credit card service, a banking service, an electronic commerce service, and/or any other suitable service. In some embodiments, the list of vouching services can include one or more services that are frequently used by the user.

At 620, process 600 can transmit one or more vouching requests to the identified vouching service(s). In some embodiments, the vouching request(s) can include any suitable information. For example, the vouching request(s) can include any suitable information that can instruct the vouching service(s) to authenticate the user. As another example, the vouching request(s) can include a cryptographic signature generated by a service that generates and/or transmits the vouching request(s). As yet another example, the vouching request(s) can include one or more suitable parameters that can be used to verify the cryptographic signature.

In some embodiments, the vouching request can be transmitted in any suitable manner. For example, the vouching request(s) can be transmitted through a client device using one or more suitable redirection requests. In a more particular example, as described above in connection with FIG. 3 (e.g., steps 315-335), a redirection request can be issued to direct the client device to a vouching service and to relay a vouching request to the vouching service. In some embodiments, a message 920 as illustrated in FIG. 9 can be used to transmit the vouching request(s). As another example, process 600 can transmit the vouching request to the vouching service(s) using one or more suitable messages, such as one or more HTTP messages.

At 625, process 600 can receive one or more vouching response(s) from the vouching service(s). In some embodiments, a vouching response can be received from each the vouching services. In some embodiments, a vouching response can include any suitable information. For example, the vouching response can include information indicating that whether the user has successfully authenticated a user account with a vouching service. In a more particular example, the vouching response can include one or more parameters (e.g., a parameter "action" 832 of FIG. 8) indicating that the user has successfully authenticated a vouching service account with a vouching service. As another example, the vouching response can include a vouching token. In some embodiments, the vouching token can include an alias associated with a vouching service account. As yet another example, the vouching response can include information indicating that the target service account has been compromised (e.g., by indicating that the user has failed to authenticate a vouching service account with the vouching service for a threshold number of times).

At 630, process 600 can determine whether the user has successfully authenticated a vouching service account with the vouching service(s). For example, process 600 can parse the vouching response(s) and can make this determination based on the information indicating that whether the user has successfully authenticated a vouching service account with the vouching service(s).

In some embodiments, in response to determining that the user has successfully authenticated one or more vouching service accounts with the vouching service(s), process 600 can determine whether each of the vouching service accounts is associated with the target service account at 635. In some embodiments, this determination can be made in any suitable manner. For example, process 600 can extract a vouching token from a vouching response corresponding to a given vouching service account (e.g., by parsing the vouching response and/or processing the vouching response in any other suitable manner) and can compare the vouching token with a token associated with the target service account (e.g., such as a token including an alias that is associated with the target service account using process 400 of FIG. 4, process 500 of FIG. 5, and/or any other suitable mechanism). Process 600 can then determine that the vouching service account is associated with the target service account in response to determining that the vouching token matches the token associated with the target service account.

In some embodiments, in response to determining that the vouching service account(s) are associated with the target service account, process 600 can transmit an authentication response at 640. In some embodiments, the authentication response can include any suitable information that can provide the user with access to the target service account. For example, the authentication response can include any suitable Web content (e.g., a Web page) associated with the target service account. As another example, the authentication response can include an authentication token that can be used to access the target service account. In some embodiments, the authentication token can be a persistent authentication token that can be used in multiple communication sessions, such as an HTTP cookie.

In some embodiments, in response to determining that the user has failed to authenticate a user account with the vouching service(s) (e.g., "NO" at 630) and/or that the second user is not associated with the target service account (e.g., "NO" at 635), process 600 can determine whether the target service account has been compromised at 645. This determination can be made in any suitable manner. For example, process 600 can determine that the target service account has been compromised in response to detecting the information in the vouching response indicating that the user has failed to authenticate a user account with the vouching service for a threshold number of time. As another example, process 600 can determine that the target service account has been compromised in response to detecting a predetermined number of unsuccessful authentication attempts in association with the target service account with one or more vouching services (e.g., one or more services implementing process 700 of FIG. 7, and/or any other suitable vouching service). As yet another example, process 600 can determine that the target service account has been compromised in response to detecting unsuccessful authentication attempts in association with a predetermined number of vouching services (e.g. "one" or any other suitable number).

In some embodiments, in response to determining that the target service account has been compromised, process 600 can generate a warning message indicating such determination at 650. Alternatively, at 655, process 600 can transmit a response message indicating that authorization has been refused for the authentication credentials received at 605.

Figure 7:
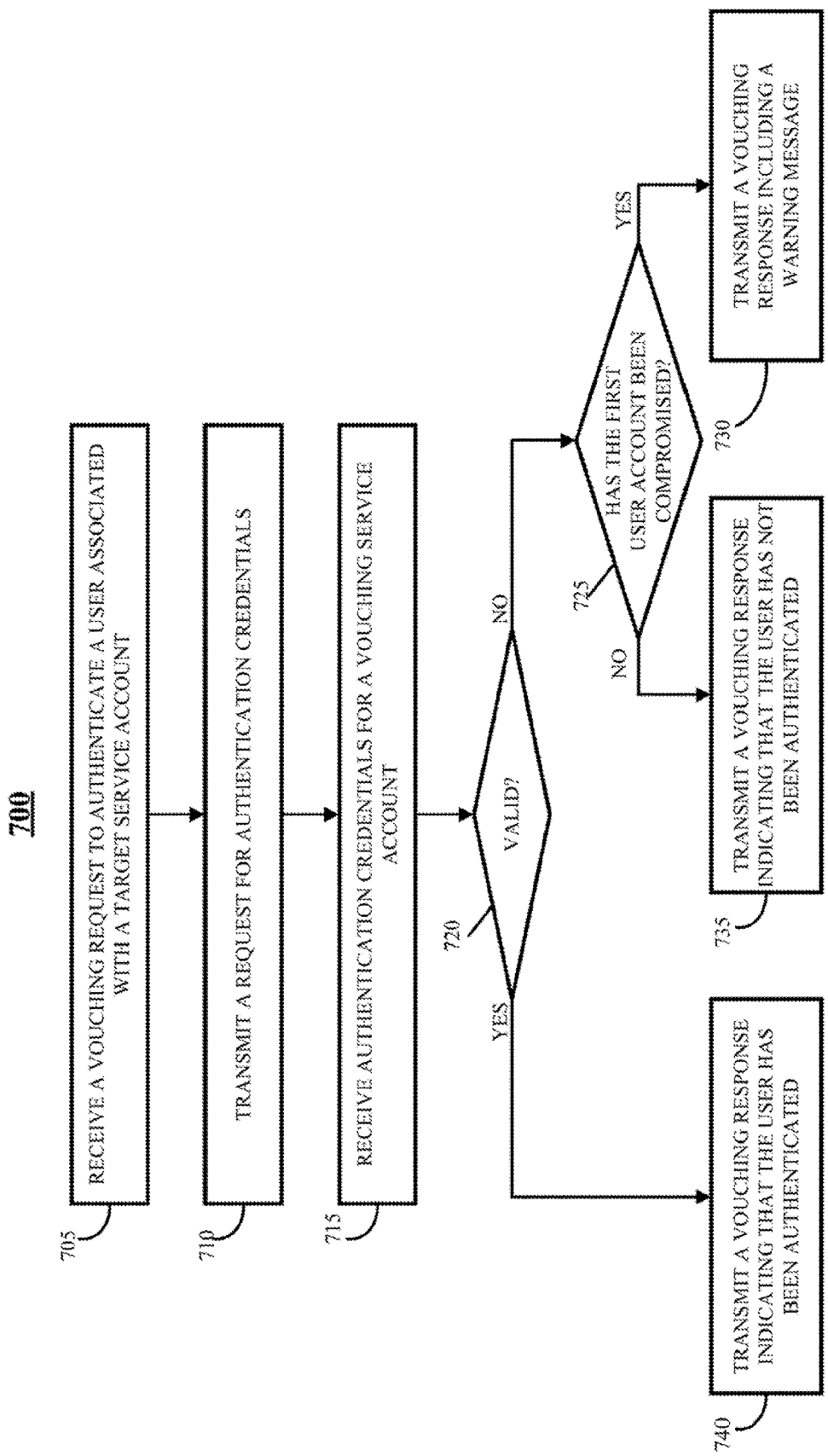
FIG. 7 shows an example of a process for vouching for a user in accordance with some embodiments of the disclosed subject matter.

Turning to FIG. 7, a flow chart of an example 700 of a process for vouching for a user in accordance with some embodiments of the disclosed subject matter is shown. In some embodiments, process 700 can be implemented using one or more hardware processors, such as a hardware processor of a vouching service 104 of FIG. 1.

As illustrated, process 700 can begin by receiving a vouching request to authenticate a user associated with a target service account at 705. In some embodiments, the vouching request can include any suitable information. For example, the vouching request can include one or more parameters that can instruct process 700 to authenticate the user. As another example, the vouching request can include information that can identify a service that initiated the request. In a more particular example, such information can include a domain name of the service, a URI associated with the service, and/or any other suitable relating to the service. As yet another example, the request can include a cryptographic signature generated by a service that initiated the request and/or any other suitable parameters that can be used to verify the cryptographic signature.

At 710, process 700 can transmit a request for authentication credentials. In some embodiments, the request for authentication credentials can be generated and/or transmitted using any suitable communication protocol, such as the Hypertext Transfer Protocol Secure (HTTPS) and/or any other suitable communication protocol that utilizes a cryptographic protocol, such as Security Sockets Layer (SSL), Transport Layer Security (TLS), and/or any other suitable cryptographic protocol.

At 715, process 700 can receive authentication credentials for a vouching service account. In some embodiments, the authentication credentials can include a user name, a password, and/or any other suitable authentication credential. In some embodiments, the authentication credentials can be received in any suitable manner. For example, the authentication credentials can be received via one or more suitable messages, such as one or more HTTPS messages.

At 720, process 700 can determine whether the received authentication credentials are valid. This determination can be made in any suitable manner. For example, process 700 can determine that the received authentication credentials are valid in response to determining that the received authentication credentials match a set of authentication credentials stored in association with the vouching service account.

As another example, process 700 can authenticate the vouching service account using one or more vouching services that have been associated with the vouching service account (e.g., using process 300 of FIG. 3 and/or process 600 of FIG. 6) and can then determine that the received authentication credentials are valid in response to successfully authenticating the vouching service account.

In some embodiments, in response to determining that one or more of the received authentication credentials are invalid, process 700 can determine whether the target service account has been compromised at 725. This determination can be made in any suitable manner. For example, process 700 can determine that the target service account has been compromised in response to detecting a threshold number of unsuccessful authentication attempts associated with the vouching service account during a particular time period. As another example, process 700 can determine that the target service account has been compromised in response to detecting a threshold number of repeated unsuccessful authentication attempts associated with the vouching service account.

In some embodiments, in response to determining that the target service account has been compromised, process 700 can transmit a vouching response indicating such determination at 730. Alternatively, process 700 can transmit a vouching response indicating that the user has failed to authenticate the vouching service account at 735.

In some embodiments, in response to determining that the received authentication credentials are valid at 720, process 700 can transmit a vouching response indicating that the vouching service account has been authenticated at 740. In some embodiments, the vouching response can include any suitable information. For example, the vouching response can include a vouching token. In some embodiments, the vouching token can include an alias associated with the vouching service account. As another example, the vouching response can include information indicating that the vouching service account has been authenticated for the user (e.g., such as a parameter "action" 832 or a parameter "action" 862 of FIG. 8). As yet another example, the vouching response can include one or more cookies (e.g., HTTP cookies). In some embodiments, subsequent authentication requests for the vouching service account can be bypassed in response to detecting the cookie(s). In some embodiments, in response to receiving information about a user action (e.g., information about items that the user wants to purchase from the target service or any other suitable service) from a target service and/or any other suitable service and/or device, a vouching service can transmit a message indicating that the user has been authenticated based on the cookie(s). Alternatively, the vouching service can initiate a re-authentication process and can authenticate the user and/or the vouching service account associated with the user (e.g., using process 700 of FIG. 7).

While the disclosed subject matter generally relates to authenticating a target service account on a target service using a vouching service account on a vouching service, this is merely illustrative. For example, the target service account can be authenticated using multiple vouching services and/or multiple vouching service accounts. In such an example, the client device can be granted access to the target service account upon successfully authenticating a predetermined number of vouching service accounts (e.g., all of the vouching service accounts associated with the target service account, a threshold number of vouching service accounts associated with the target service account, a predetermined percentage of vouching service accounts associated with the target service account, and/or any other suitable number of vouching service accounts). In some embodiments, each of the vouching service accounts can be authenticated using one or more suitable portions of process 700 of FIG. 7.

It should be noted that the above steps of the flow diagrams of FIGS. 3-7 can be executed or performed in any order or sequence not limited to the order and sequence shown and described in the figures. Also, some of the above steps of the flow diagrams of FIGS. 3-7 can be executed or performed substantially simultaneously where appropriate or in parallel to reduce latency and processing times. Furthermore, it should be noted that FIGS. 3-7 are provided as examples only. At least some of the steps shown in these figures may be performed in a different order than represented, performed concurrently, or altogether omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, methods, systems, and media for authenticating a user using multiple services are provided.

Although the disclosed subject matter has been described and illustrated in the foregoing illustrative embodiments, it is understood that the present disclosure has been made only by way of example, and that numerous changes in the details of implementation of the disclosed subject matter can be made without departing from the spirit and scope of the disclosed subject matter, which is limited only by the claims that follow. Features of the disclosed embodiments can be combined and rearranged in various ways.

What is claimed is:

1. A method for authenticating a user using multiple services, the method comprising:
   receiving, from a client device, first user-entered credentials for a target service account;
   authenticating the target service account based on the first user-entered credentials;
   issuing a redirecting request that directs the client device to at least one vouching service in response to authenticating the target service account;
   receiving a vouching response indicating that the client device has authenticated a vouching service account with the at least one vouching service by providing second user-entered credentials to the vouching service, wherein the vouching response includes a vouching token, and wherein the second user-entered credentials are different from the first user-entered credentials;
   determining, using a hardware processor, whether the vouching service account is associated with the target service account based on the vouching token; and
   providing the client device with access to the target service account in response to (1) authenticating the target service account based on the first user-entered credentials, (2) receiving the vouching response indicating that the client device has authenticated the vouching service account with the at least one vouching service, and (3) determining that the vouching service account is associated with the target service account.

2. The method of claim 1, further comprising:
   identifying a plurality of vouching services associated with the target service account;
   transmitting a plurality of vouching requests to the plurality of vouching services;
   receiving a plurality of vouching responses from at least a set of the plurality of vouching services;
   extracting a plurality of vouching tokens from the plurality of vouching responses; and authenticating the target user account based on the plurality of vouching tokens.

3. The method of claim 1, further comprising:
   comparing a first alias associated with the target service account with a second alias associated with the vouching service account; and
   determining that the vouching service account is associated with the target service account in response to determining that the first alias matches the second alias, wherein the vouching token includes the second alias.

4. The method of claim 3, further comprising:
   receiving a request to associate the target service account with the vouching service;
   transmitting, to the vouching service, a vouching response including the first alias;
   receiving a vouching response indicating that the vouching service account has been authenticated; and
   associating the first alias with the target service account in response to receiving the vouching response.

5. The method of claim 1, further comprising transmitting a persistent token to the client device in response to determining that the vouching service account is associated with the target service account.

6. The method of claim 1, further comprising:
   generating a plurality of decoy credentials based on the first user-entered credentials; and
   associating the plurality of decoy credentials with the target service account.

7. The method of claim 6, further comprising authenticating the target service account in response to receiving at least one of the plurality of decoy credentials.

8. The method of claim 1, further comprising determining that the target service account has been compromised in response to detecting a threshold number of unsuccessful authentication attempts in association with the vouching service account.

9. A system for authenticating a user using multiple services, the system comprising:
   at least one hardware processor that is configured to:
   receive, from a client device, first user-entered credentials for a target service account;
   authenticate the target service account based on the first user-entered credentials;
   issue a redirecting request that directs the client device to at least one vouching service in response to authenticating the target service account;
   receive a vouching response indicating that the client device has authenticated a vouching service account with the at least one vouching service by providing second user-entered credentials to the vouching service, wherein the vouching response includes a vouching token, and wherein the second user-entered credentials are different from the first user-entered credentials;
   determine whether the vouching service account is associated with the target service account based on the vouching token; and
   provide the client device with access to the target service account in response to (1) authenticating the target service account based on the first user-entered credentials, (2) receiving the vouching response indicating that the client device has authenticated the vouching service account with the at least one vouching service, and (3) determining that the vouching service account is associated with the target service account.

10. The system of claim 9, wherein the hardware processor is further configured to:
    identify a plurality of vouching services associated with the target service account;
    transmit a plurality of vouching requests to the plurality of vouching services;
    receive a plurality of vouching responses from at least a set of the plurality of vouching services;
    extract a plurality of vouching tokens from the plurality of vouching responses; and
    authenticate the target user account based on the plurality of vouching tokens.

11. The system of claim 9, wherein the hardware processor is further configured to:
    compare a first alias associated with the target service account with a second alias associated with the vouching service account; and
    determine that the vouching service account is associated with the target service account in response to determining that the first alias matches the second alias, wherein the vouching token includes the second alias.

12. The system of claim 11, wherein the hardware processor is further configured to:
    receive a request to associate the target service account with the vouching service;

transmit, to the vouching service, a vouching response including the first alias;

receive a vouching response indicating that the vouching service account has been authenticated; and associate the first alias with the target service account in response to receiving the vouching response.

13. The system of claim 9, wherein the hardware processor is further configured to transmit a persistent token to the client device in response to determining that the vouching service account is associated with the target service account.

14. The system of claim 9, wherein the hardware processor is further configured to:

generate a plurality of decoy credentials based on the first user-entered credentials; and associate the plurality of decoy credentials with the target service account.

15. The system of claim 14, wherein the hardware processor is further configured to authenticate the target service account in response to receiving at least one of the plurality of decoy credentials.

16. The system of claim 9, wherein the hardware processor is further configured to determine that the target service account has been compromised in response to detecting a threshold number of unsuccessful authentication attempts in association with the vouching service account.

17. A non-transitory computer-readable medium containing computer-executable instructions that, when executed by a processor, cause the processor to perform a method for authenticating a user using multiple services, the method comprising:

receiving, from a client device, first user-entered credentials for a target service account;

authenticating the target service account based on the first user-entered credentials;

issuing a redirecting request that directs the client device to at least one vouching service in response to authenticating the target service account;

receiving a vouching response indicating that the client device has authenticated a vouching service account with the at least one vouching service by providing second user-entered credentials to the vouching service, wherein the vouching response includes a vouching token, and wherein the second user-entered credentials are different from the first user-entered credentials;

determining whether the vouching service account is associated with the target service account based on the vouching token; and providing the client device with access to the target service account in response to (1) authenticating the target service account based on the first user-entered credentials, (2) receiving the vouching response indicating that the client device has authenticated the vouching service account with the at least one vouching service, and (3) determining that the vouching service account is associated with the target service account.

18. The non-transitory computer-readable medium of claim 17, wherein the method further comprises:

identifying a plurality of vouching services associated with the target service account;

transmitting a plurality of vouching requests to the plurality of vouching services;

receiving a plurality of vouching responses from at least a set of the plurality of vouching services;

extracting a plurality of vouching tokens from the plurality of vouching responses; and authenticating the target user account based on the plurality of vouching tokens.

19. The non-transitory computer-readable medium of claim 17, wherein the method further comprises:

comparing a first alias associated with the target service account with a second alias associated with the vouching service account; and determining that the vouching service account is associated with the target service account in response to determining that the first alias matches the second alias, wherein the vouching token includes the second alias.

20. The non-transitory computer-readable medium of claim 19, wherein the method further comprises:

receiving a request to associate the target service account with the vouching service;

transmitting, to the vouching service, a vouching response including the first alias;

receiving a vouching response indicating that the vouching service account has been authenticated; and associating the first alias with the target service account in response to receiving the vouching response.

21. The non-transitory computer-readable medium of claim 17, wherein the method further comprises transmitting a persistent token to the client device in response to determining that the vouching service account is associated with the target service account.

22. The non-transitory computer-readable medium of claim 17, wherein the method further comprises:

generating a plurality of decoy credentials based on the first user-entered credentials; and associating the plurality of decoy credentials with the target service account.

23. The non-transitory computer-readable medium of claim 22, wherein the method further comprises authenticating the target service account in response to receiving at least one of the plurality of decoy credentials.

24. The non-transitory computer-readable medium of claim 17, wherein the method further comprises determining that the target service account has been compromised in response to detecting a threshold number of unsuccessful authentication attempts in association with the vouching service account.

* * * * *